US 7,006,707 B2
Feb. 28, 2006

(12) United States Patent
Peterson

(54) PROJECTING IMAGES ONTO A SURFACE

(75) Inventor: John Peterson, Menlo Park, CA (US)

(73) Assignee: Adobe Systems Incorporated, San Jose, CA (US)

(*) Notice: Subject to any disclaimer, the term of this patent is extended or adjusted under 35 U.S.C. 154(b) by 695 days.

(21) Appl. No.: 09/848,017

(22) Filed: May 3, 2001

(65) Prior Publication Data
US 2002/0181802 A1 Dec. 5, 2002

(51) Int. Cl.
G06T 3/00 (2006.01)

(52) U.S. Cl. .................................. 382/285; 382/294
(58) Field of Classification Search ............. 382/285, 382/294; 352/284
See application file for complete search history.

(56) References Cited

U.S. PATENT DOCUMENTS

| 4,057,338 | A | * | 11/1977 | Yevick | 355/1 |
| 5,528,290 | A | | 6/1996 | Saund | 348/28.1 |
| 5,657,096 | A | | 8/1997 | Lukacs | 348/585 |
| 5,802,202 | A | * | 9/1998 | Yamada et al. | 382/154 |
| 5,838,837 | A | * | 11/1998 | Hirosawa et al. | 382/284 |
| 5,963,664 | A | * | 10/1999 | Kumar et al. | 382/154 |
| 5,986,668 | A | | 11/1999 | Szeliski et al. | 345/634 |
| 5,987,164 | A | | 11/1999 | Szeliski et al. | |
| 6,043,837 | A | | 3/2000 | Driscoll, Jr. et al. | 348/36 |
| 6,075,905 | A | * | 6/2000 | Herman et al. | 382/284 |
| 6,078,701 | A | * | 6/2000 | Hsu et al. | 382/294 |
| 6,084,592 | A | | 7/2000 | Shum et al. | |
| 6,128,108 | A | | 10/2000 | Teo | 358/540 |
| 6,246,413 | B1 | | 6/2001 | Teo | 345/419 |
| 6,249,616 | B1 | | 6/2001 | Hashimoto | 382/284 |
| 6,356,297 | B1 | | 3/2002 | Cheng et al. | 348/36 |
| 6,385,349 | B1 | | 5/2002 | Teo | 382/284 |
| 6,389,179 | B1 | * | 5/2002 | Katayama et al. | 382/284 |
| 6,532,036 | B1 | | 3/2003 | Peleg et al. | |
| 6,535,650 | B1 | | 3/2003 | Poulo et al. | 382/294 |
| 6,618,511 | B1 | | 9/2003 | Mancuso et al. | 382/293 |
| 6,643,413 | B1 | | 11/2003 | Shum et al. | |
| 6,704,041 | B1 | * | 3/2004 | Katayama et al. | 348/36 |
| 6,714,689 | B1 | | 3/2004 | Yano et al. | |

FOREIGN PATENT DOCUMENTS

WO   WO 98/02844   1/1998

OTHER PUBLICATIONS

"Stitcher—High Resolution Panoramas—for Professionals Only!" http://www.realviz.com/products/stitcher/index.htm, REALVIZ, S.A Jun. 15, 2000 (3 Pages).
"Stitcher—Major Features and Benefits" http://www.realviz.com/products/stitcher/majorfeatures.htm, REALVIZ, S.A. Jun. 15, 2000 (2 Pages).
"Stitcher—Success Stories" http://www.realviz.com/products/stitcher/success.htm. REALLVIZ, S.A. Jun. 15, 2000 (1 Page).
"Stitcher—Key Features" http://www.realviz.com/products/stitcher/mainfeatures.htm, REALVIZ, S.A. Jun. 15, 2000 (3 Pages).

(Continued)

Primary Examiner—Daniel Miriam
Assistant Examiner—Dennis Rosario-Vasquez
(74) Attorney, Agent, or Firm—Fish & Richardson P.C.

(57) ABSTRACT

The orientation of a camera associated with a first image is determined based on a shape of a perimeter of a corrected version of the first image. The corrected version of the first image has less perspective distortion relative to a reference image than the first image. The shape of the perimeter of the corrected version of the first image is also different from the shape of the perimeter of the first image. The first image is then projected onto a surface based on the orientation of the camera.

44 Claims, 20 Drawing Sheets

OTHER PUBLICATIONS

Bernd Girod et al., "Direct Estimation of Displacement Histograms", OSA Meeting on Image Understanding and Machine Vision, Cape Cod, MA, Jun. 1989, pp. 1–4.

James R. Bergen et al., "A Three Frame Algorithm for Estimating Two–Component Image Motion", David Sarnoff Research Center, Subsidiary of SRI International, Princeton, NJ 08543–5300, pp. 1–24.

Steve Mann et al., "Virtual Bellows: Constructing High Quality Stills From Video", M.I.T. Media Laboratory Perceptual Computing Section Technical Report No. 259 Appears, Proc. First IEEE Int. Conf. On Image Proc. Austin, TX, Nov. 1994, pp. 1–5.

Reinhard Klette et al., "Computer Vision. Three–Dimensional Data From Images", Springer–Verlag Singapore Pte. Ltd. 1998, pp. 48–56.

Richard Szeliski et al., Creating Full View Panoramic Image Mosaics and Environment Maps, Microsoft Research, 8 pp.

Paul S. Heckbert, "Fundamentals of Texture Mapping and Image Warping", *Master's Thesis* under the direction of Carlo Séquin, Dept. of Electrical Engineering and Computer Science, University of California, Berkeley, California, Jun. 17, 1989, 86 pages.

Shun et al., "Rendering with Concentric Mosaics," (1999) Microsoft Research, pp. 299–306.

Xiong, et al., "Registration, Calibration and Blending in Creating High Quality Panoramas", Applications of Computer Vision, Proceedings of the Fourth IEEE Workshop, Los Alamitos, CA Oct. 19–21, 1998, pp. 69–74.

* cited by examiner

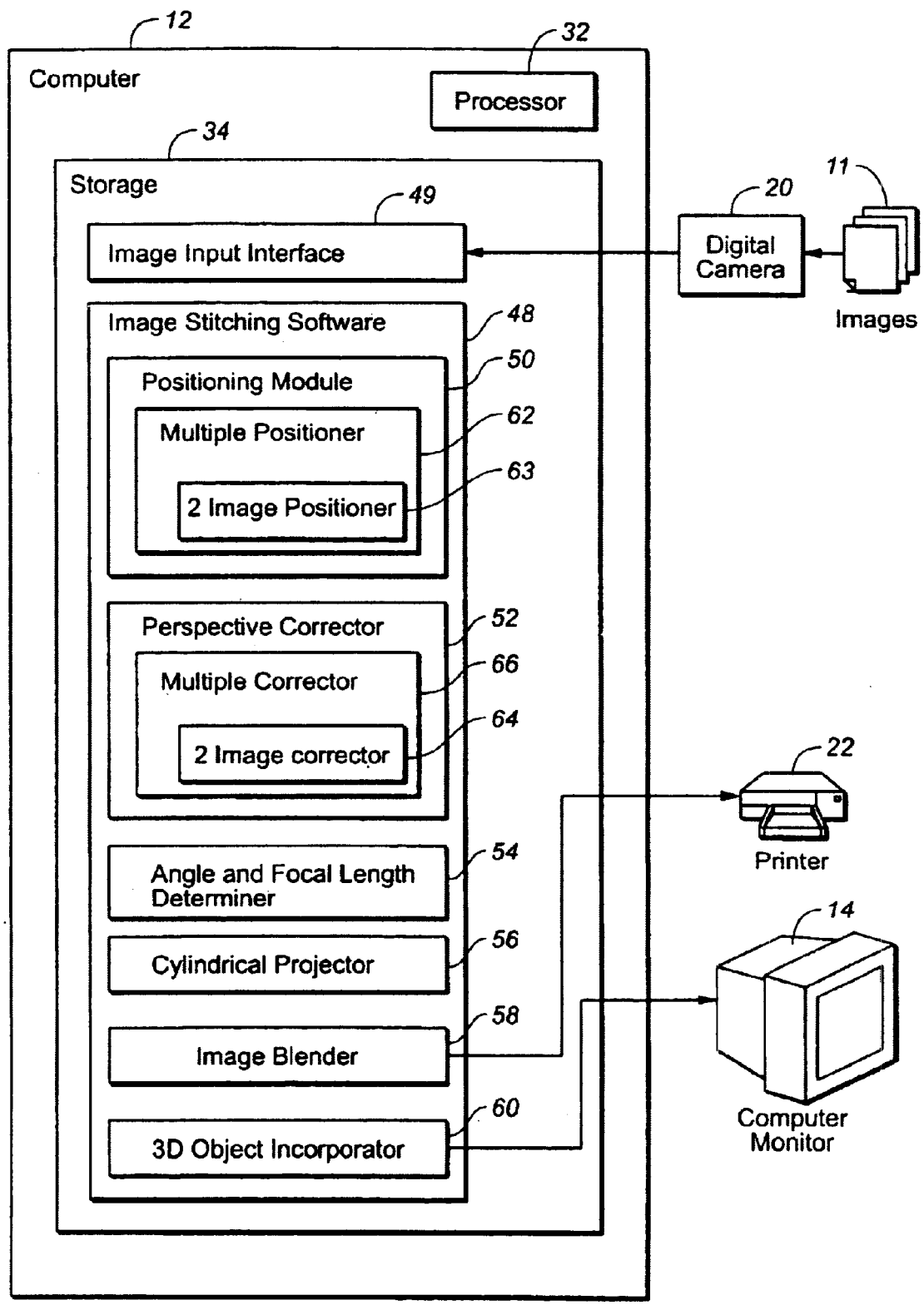
FIG._1

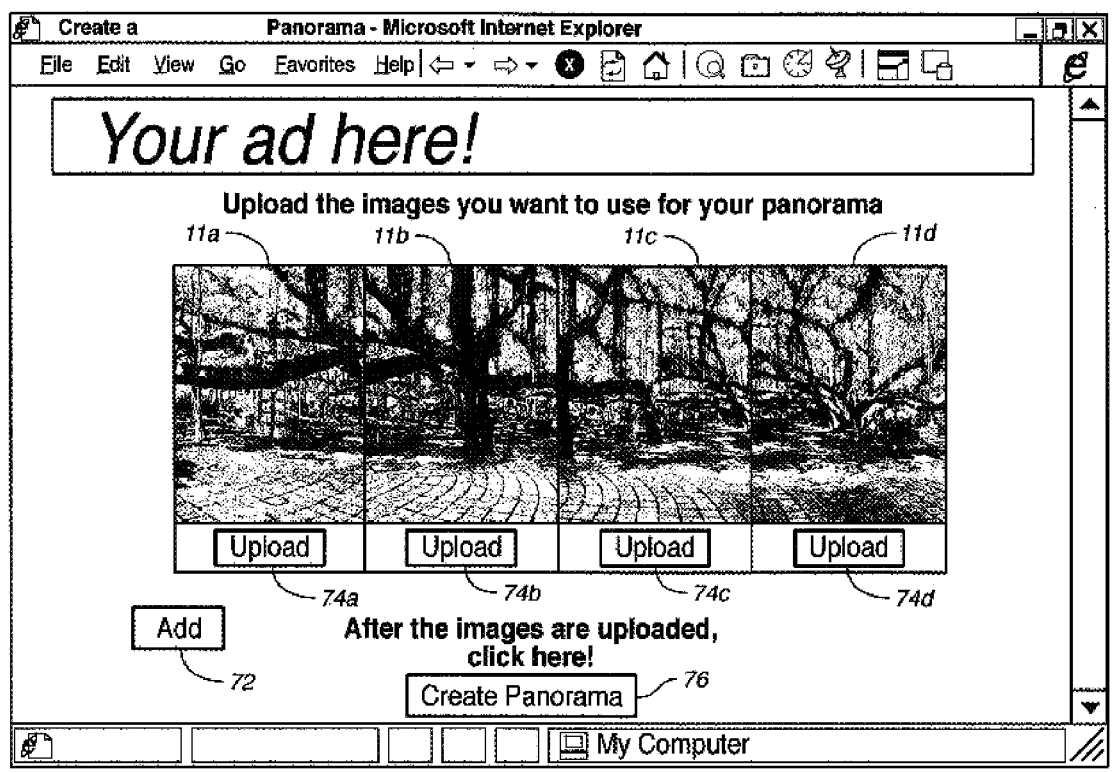
FIG._2A

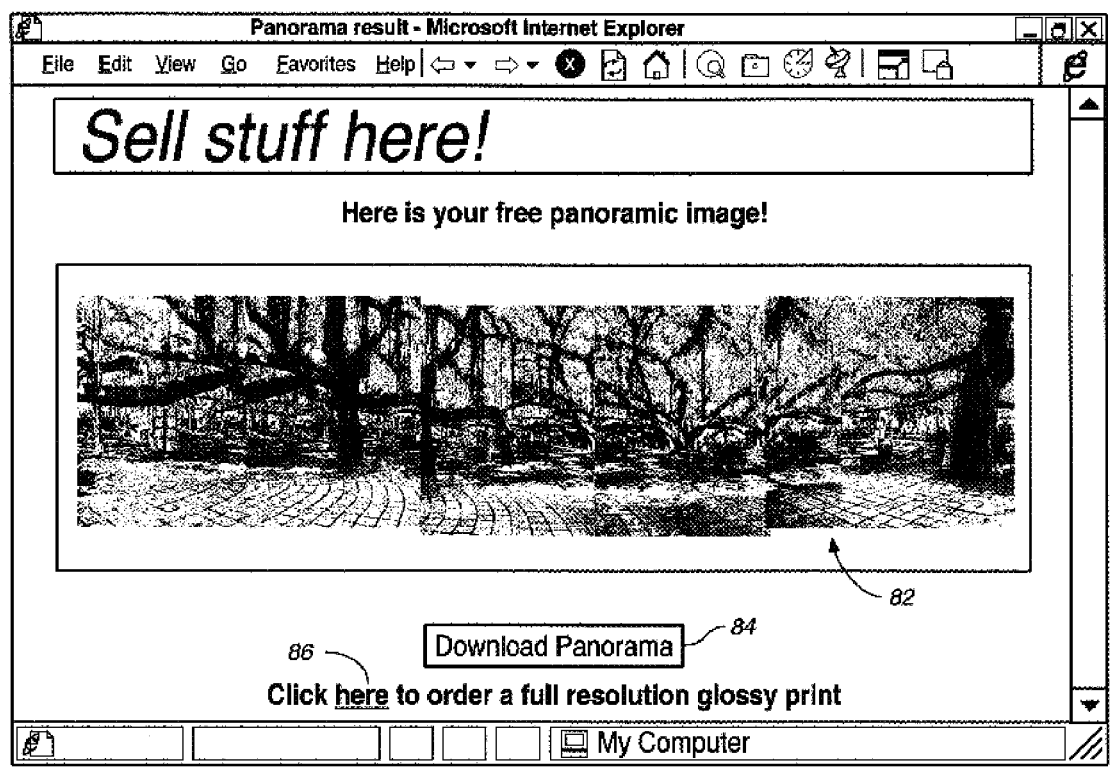
FIG._2B

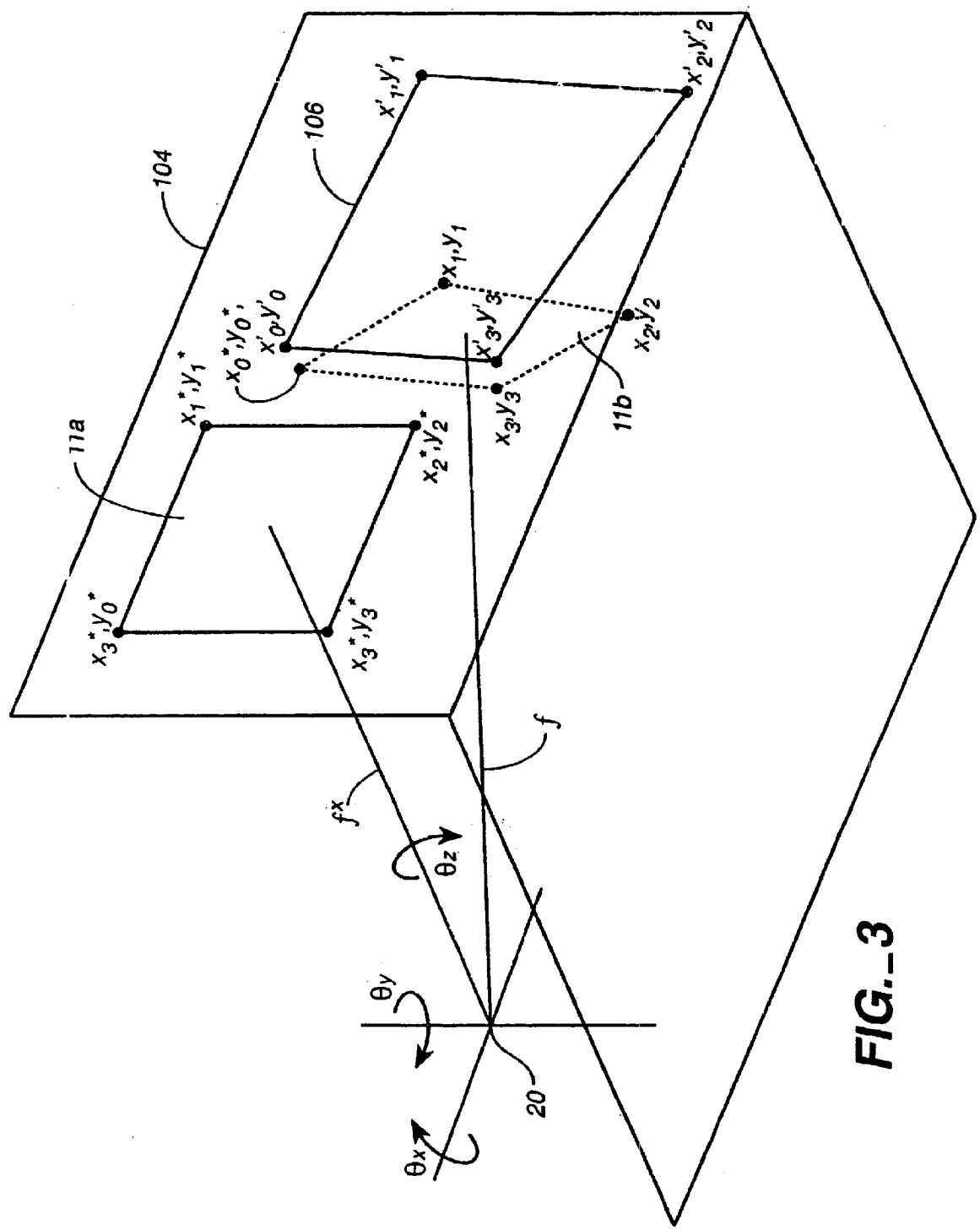
FIG._3

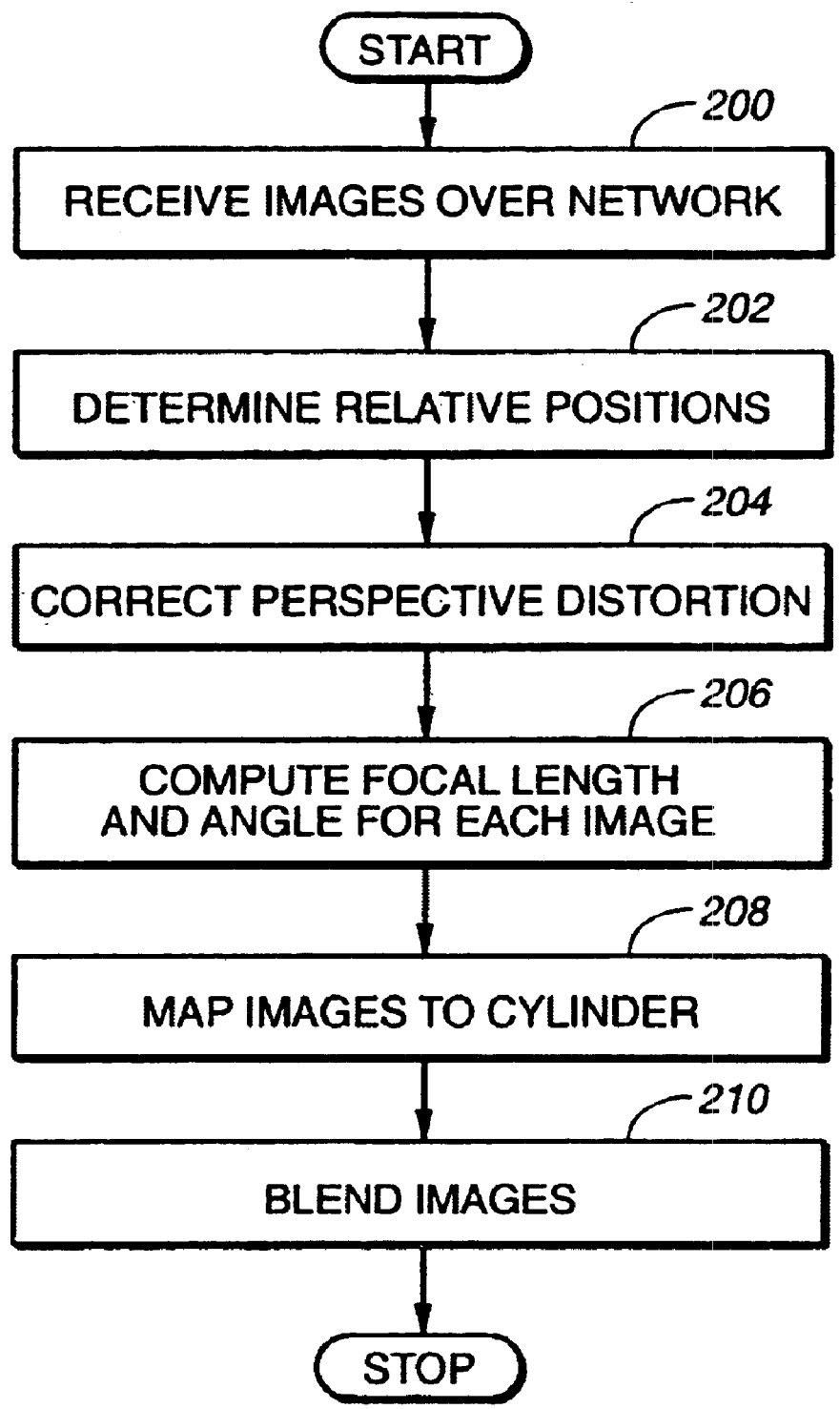
FIG._4

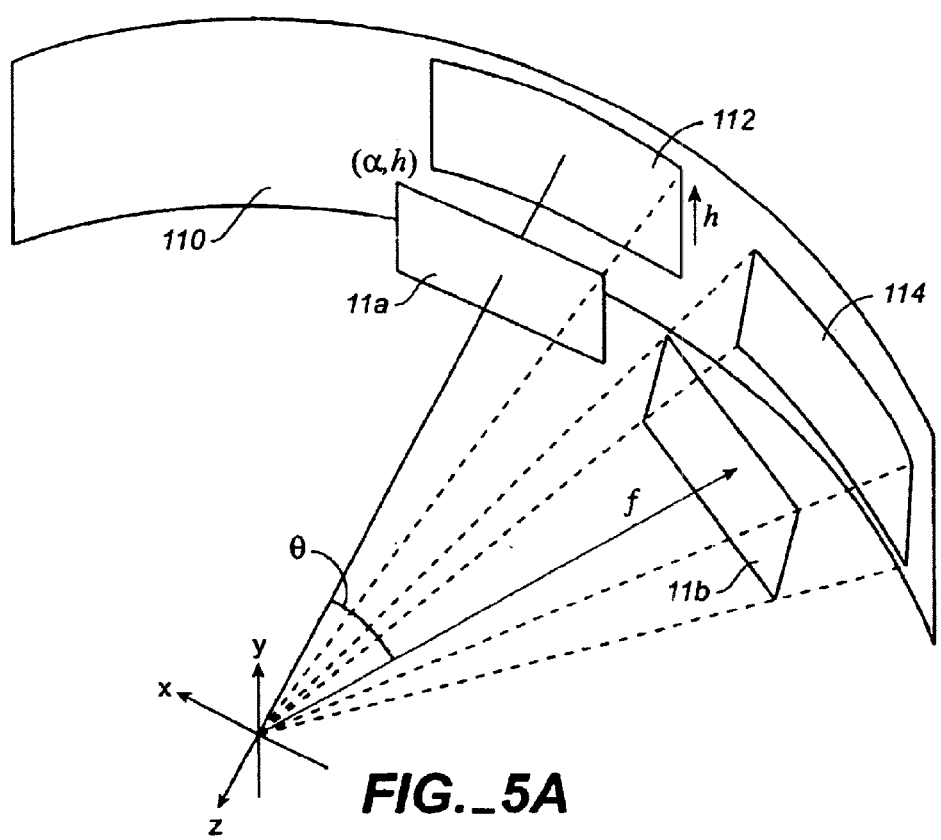
FIG._5A
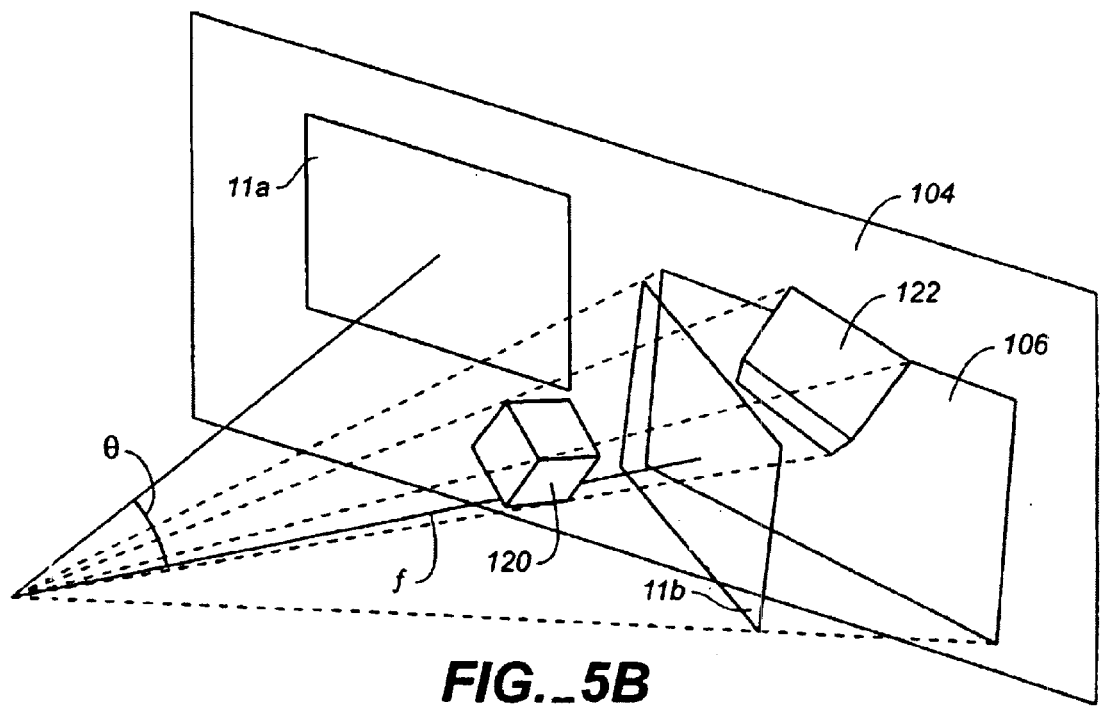
FIG._5B

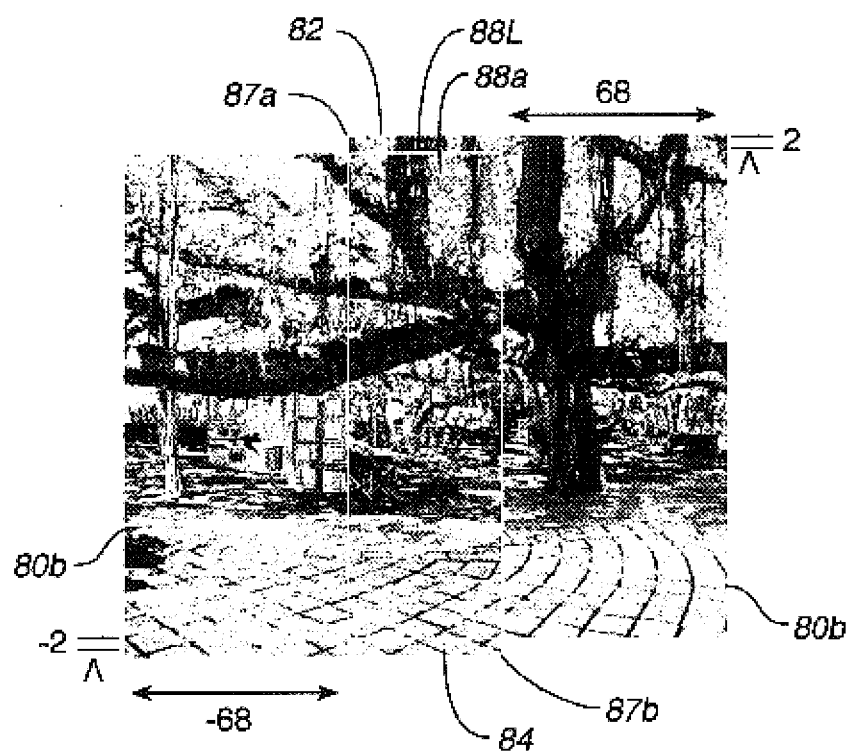
FIG._6A
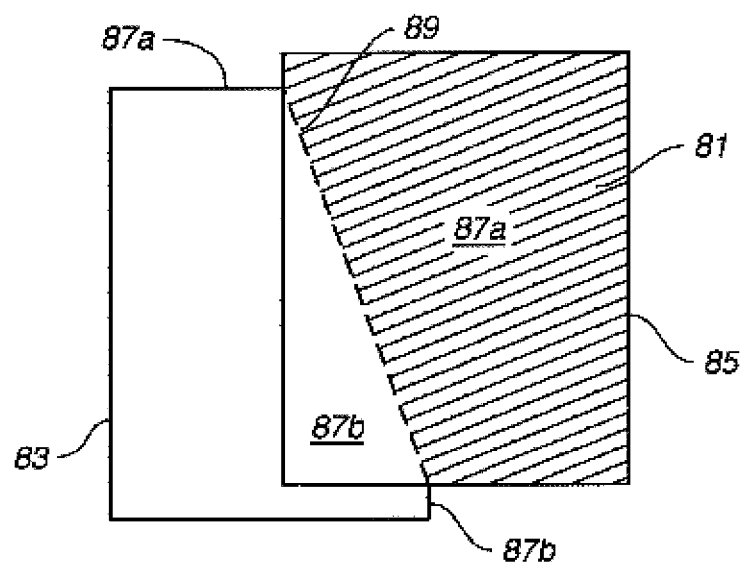
FIG._6F

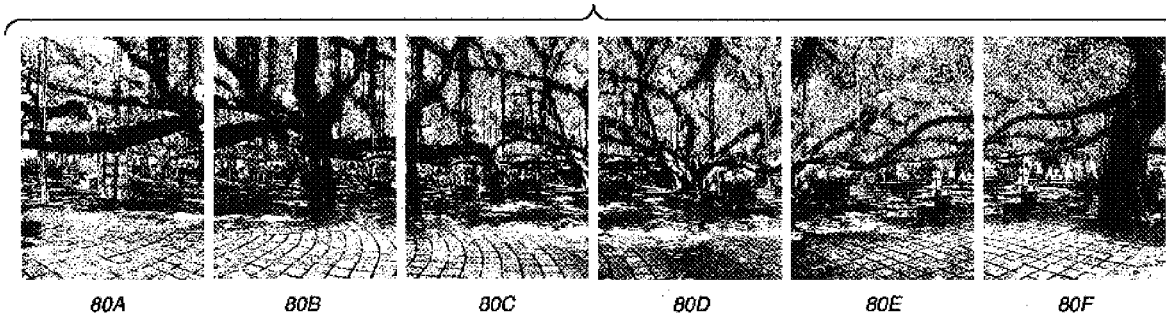
FIG._6B
FIG._6C

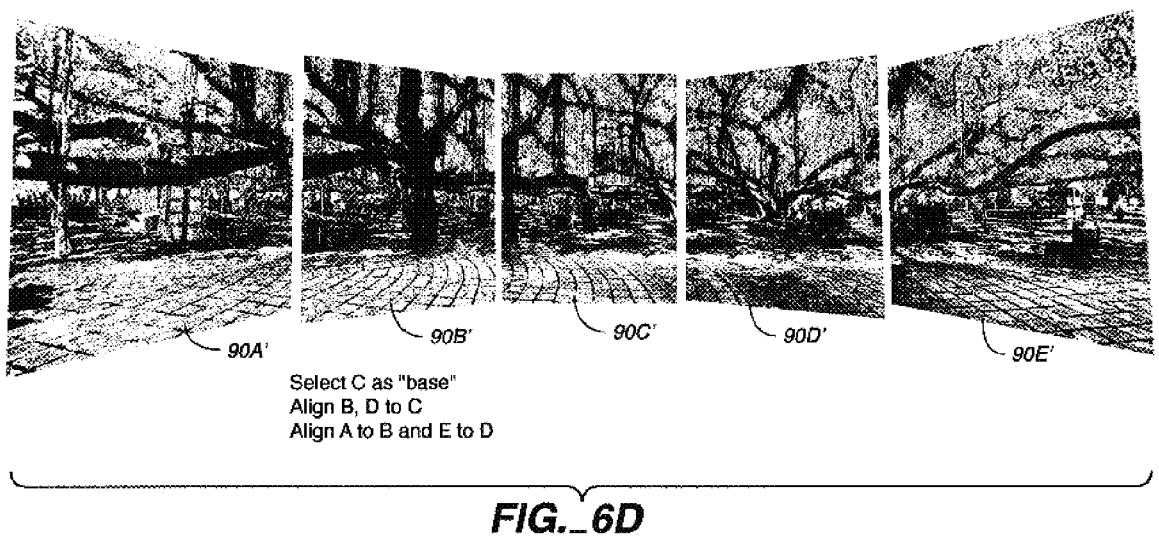
FIG._6D

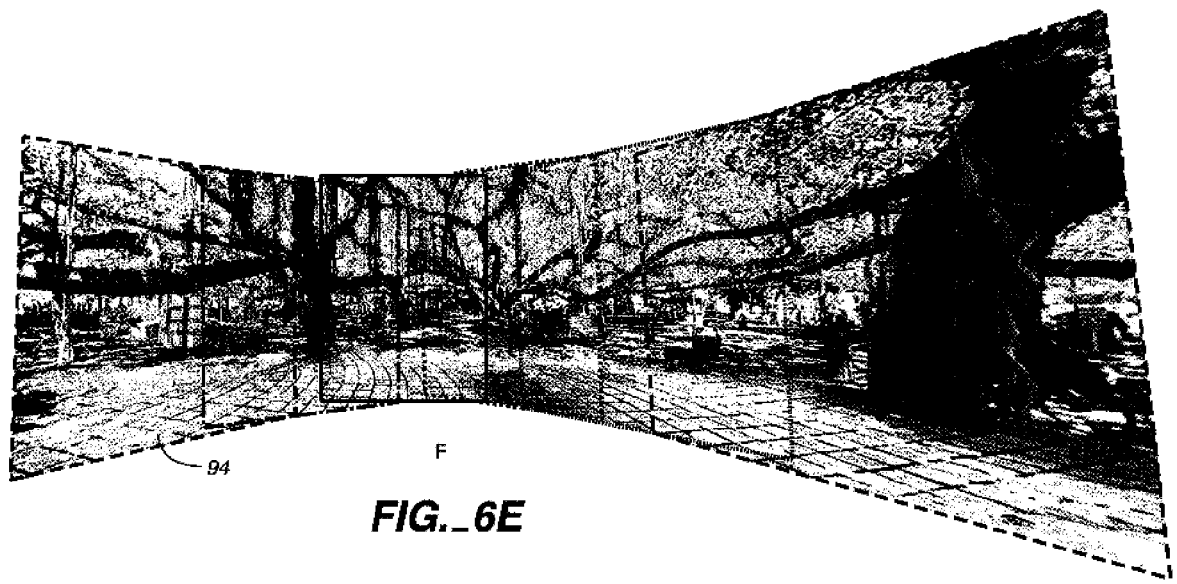
FIG._6E

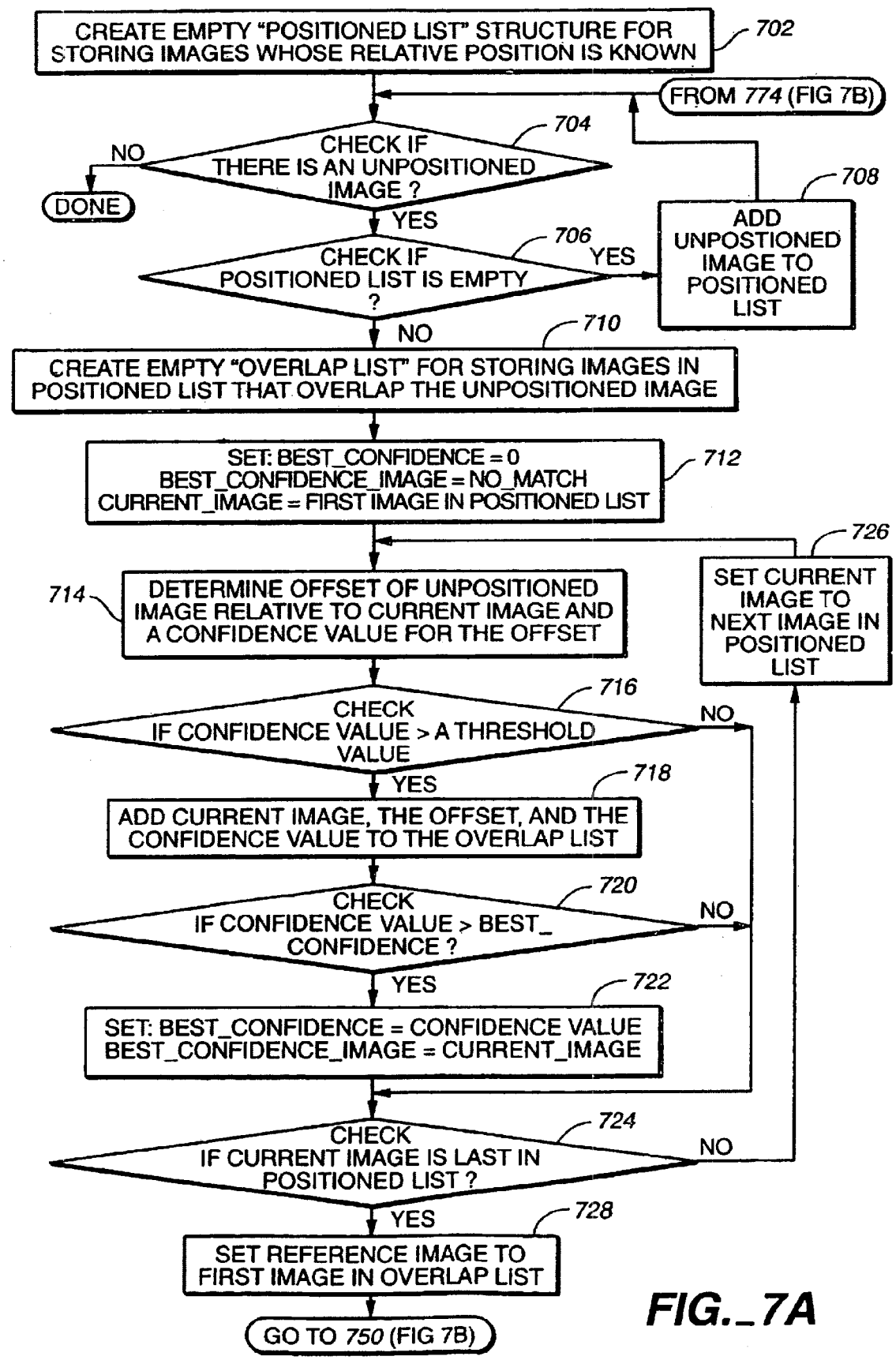
FIG._7A

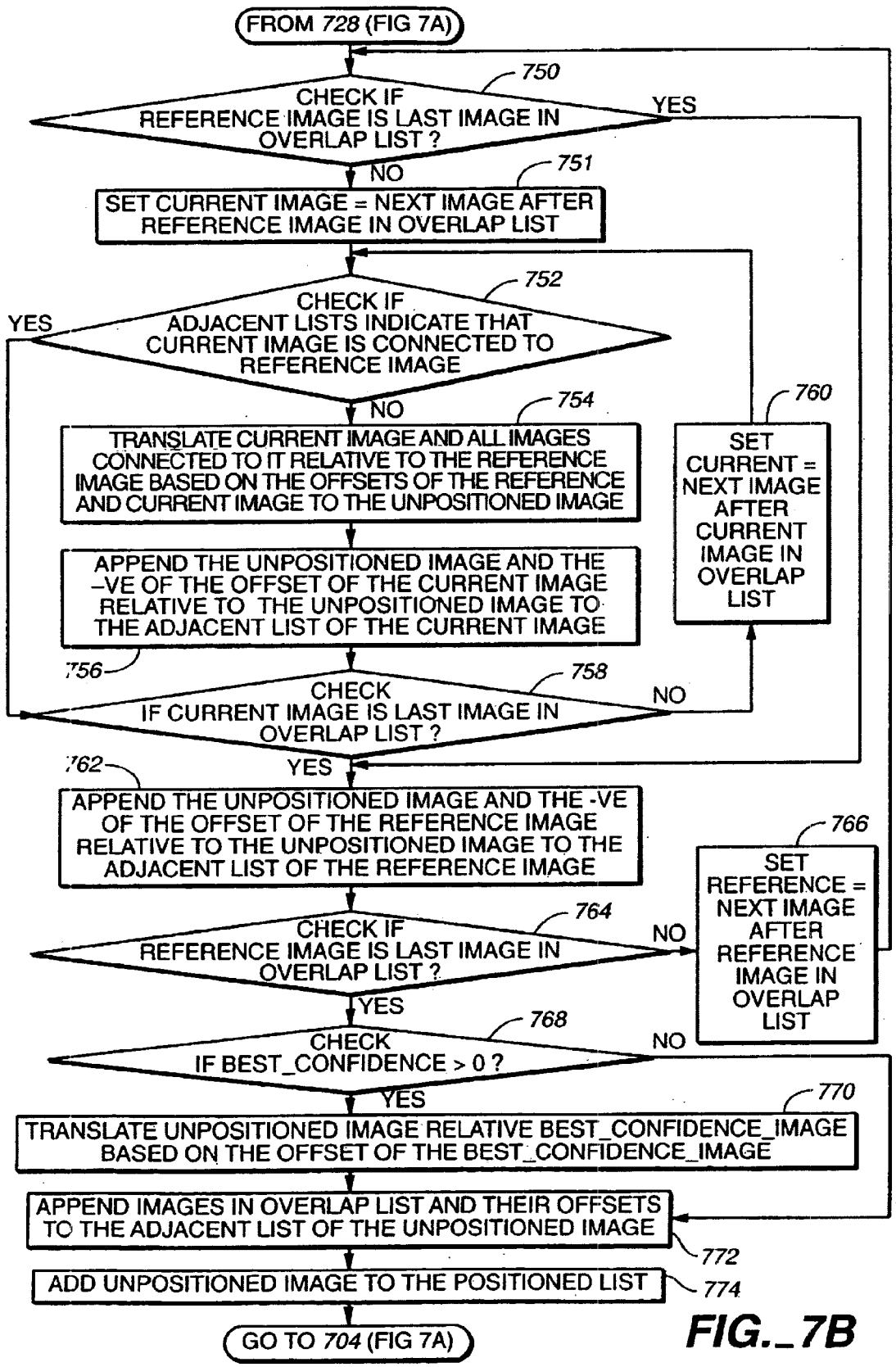

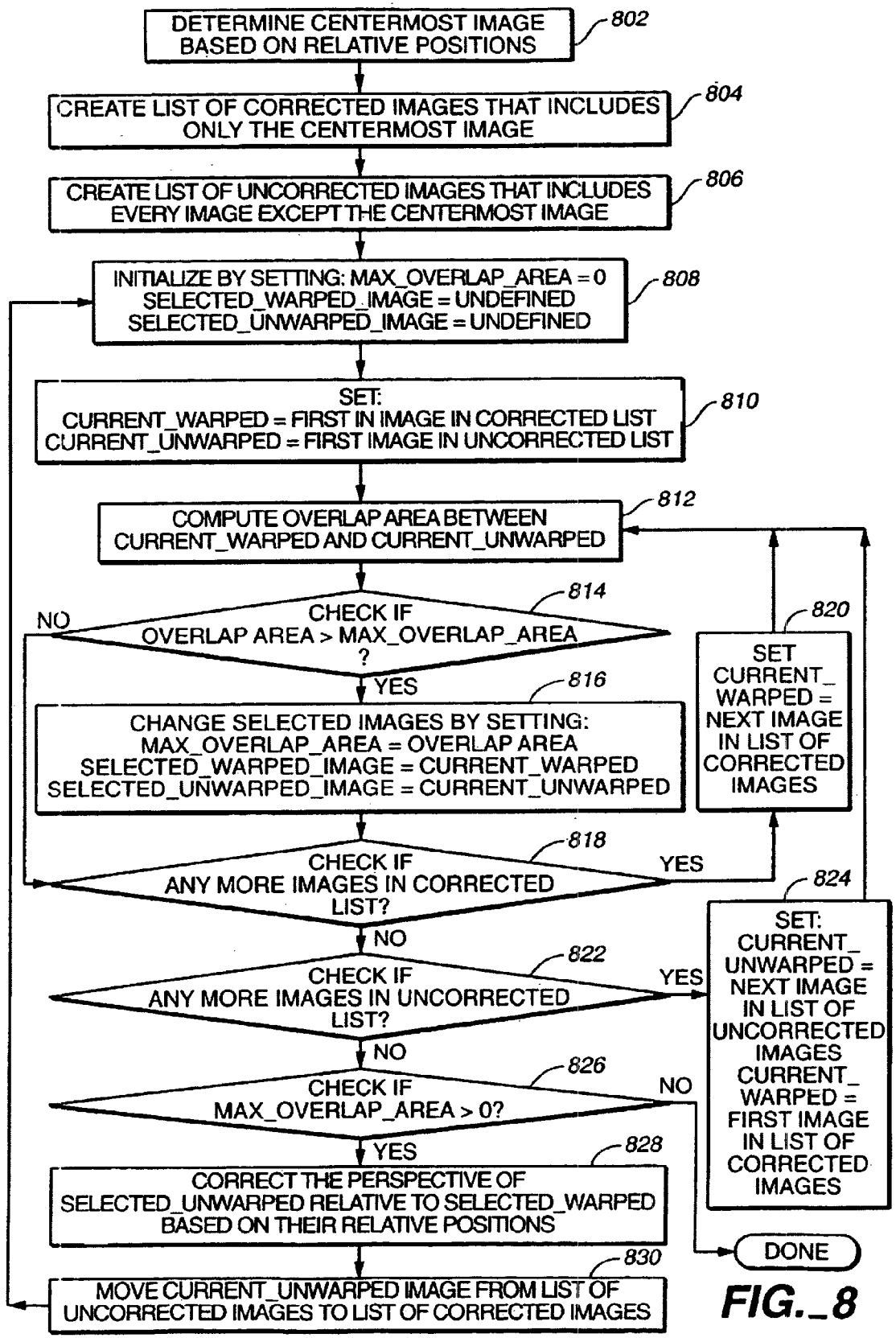
FIG._8

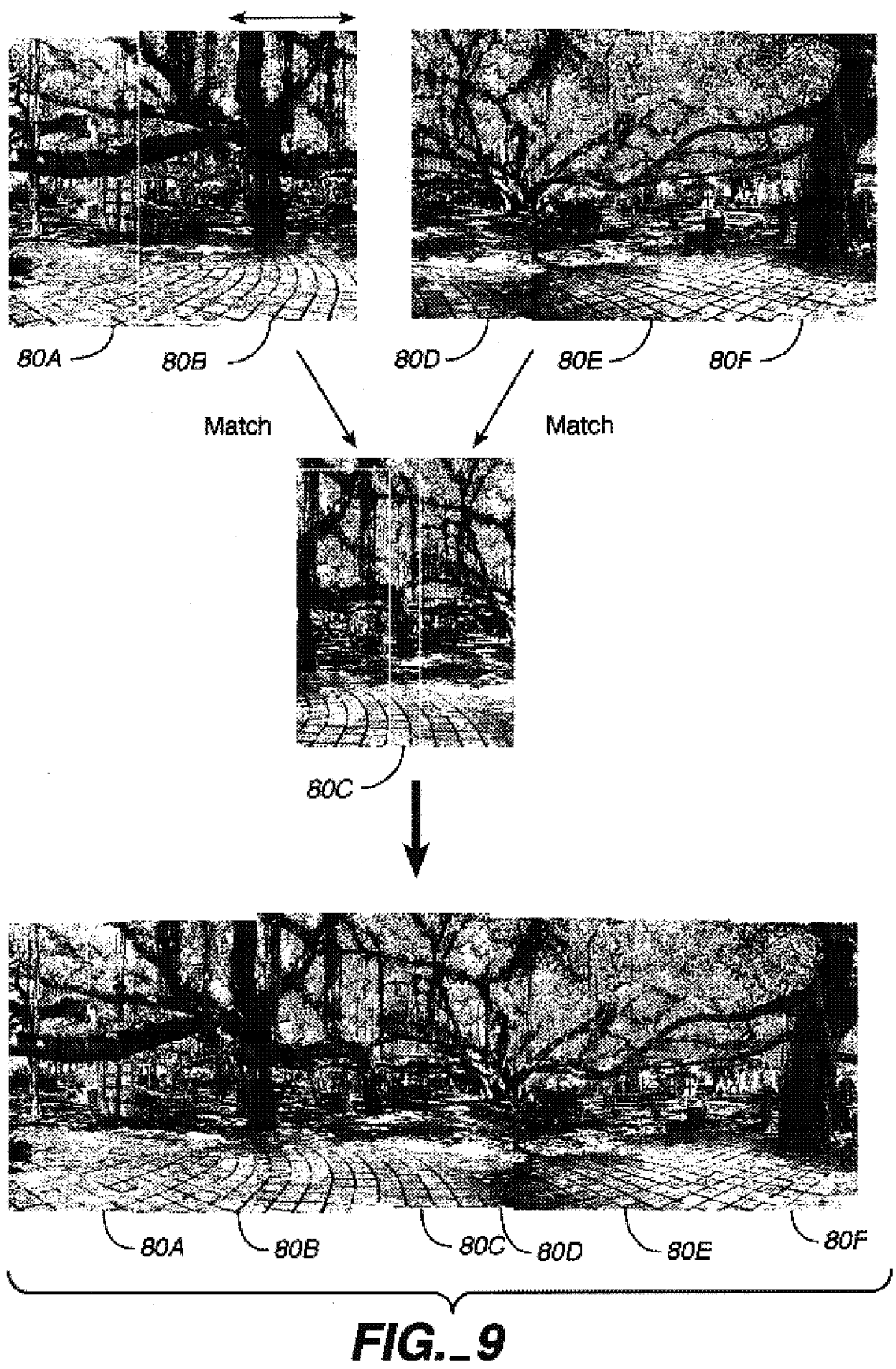
FIG._9

Original Image
| | 2-D coordinates | 4-D coordinates |
|---|---|---|
| Vertex 0 | $(x_0, y_0)$ | $(x_0, y_0, 0, 1)$ |
| Vertex 1 | $(x_1, y_1)$ | $(x_1, y_1, 0, 1)$ |
| Vertex 2 | $(x_2, y_2)$ | $(x_2, y_2, 0, 1)$ |
| Vertex 3 | $(x_3, y_3)$ | $(x_3, y_3, 0, 1)$ |
| The $i^{th}$ vertex | $(x_i, y_i)$ | $(x_i, y_i, 0, 1)$ |
130  132  134
FIG._10A
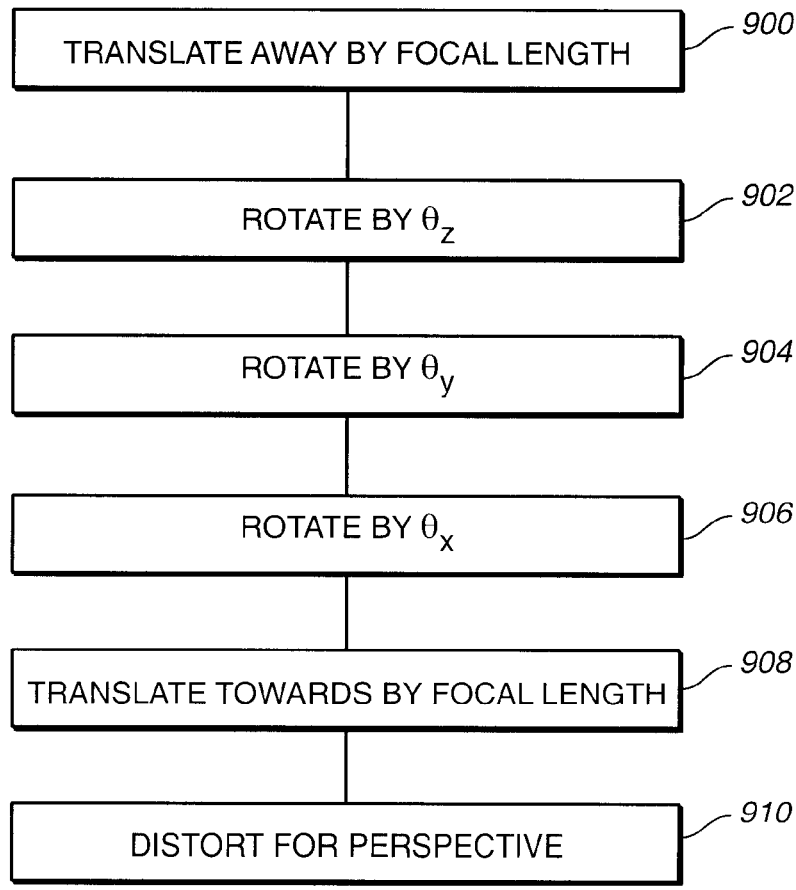
FIG._10B

Perspective Correction Transformation

1. Translate outwards:

$$T_a = \begin{bmatrix} 1 & 0 & 0 & 0 \\ 0 & 1 & 0 & 0 \\ 0 & 0 & 1 & 0 \\ 0 & 0 & f & 1 \end{bmatrix} \text{— 136}$$

2. Three rotations:

$$\Theta_x = \begin{bmatrix} 1 & 0 & 0 & 0 \\ 0 & \cos\theta_x & \sin\theta_x & 0 \\ 0 & -\sin\theta_x & \cos\theta_x & 0 \\ 0 & 0 & 0 & 1 \end{bmatrix} \text{— 140} \quad \Theta_y = \begin{bmatrix} \cos\theta_y & 0 & -\sin\theta_y & 0 \\ 0 & 1 & 0 & 0 \\ \sin\theta_y & 0 & \cos\theta_y & 0 \\ 0 & 0 & 0 & 1 \end{bmatrix} \text{— 142}$$

$$\Theta_z = \begin{bmatrix} \cos\theta_z & \sin\theta_z & 0 & 0 \\ -\sin\theta_z & \cos\theta_z & 0 & 0 \\ 0 & 0 & 1 & 0 \\ 0 & 0 & 0 & 1 \end{bmatrix} \text{— 138}$$

3. Translate inwards:

$$T_b = \begin{bmatrix} 1 & 0 & 0 & 0 \\ 0 & 1 & 0 & 0 \\ 0 & 0 & 1 & 0 \\ 0 & 0 & -f & 1 \end{bmatrix} \text{— 144}$$

4. Effect of focal length on Perspective:

$$P = \begin{bmatrix} 1 & 0 & 0 & 0 \\ 0 & 1 & 0 & 0 \\ 0 & 0 & 0 & 1/f \\ 0 & 0 & 0 & 1 \end{bmatrix} \text{— 146}$$

FIG._10C

Perspective Correction

Perspective Corrected Image Vertices given by:

$$\widehat{p}_i = p_i T_a \Theta_z \Theta_y \Theta_x T_b P = [\widehat{x}_i, \widehat{y}_i, \widehat{z}_i, \widehat{w}_i] \quad /\text{—}150$$

$$\underbrace{\phantom{[\widehat{x}_i, \widehat{y}_i, \widehat{z}_i, \widehat{w}_i]}}_{152}$$

But:

$$\widehat{w}_i = -\frac{x_i}{f}(-\sin\theta_z \sin\theta_x + \cos\theta_z \sin\theta_y \cos\theta_y)$$

$$+ \frac{y_i}{f}(\cos\theta_z \sin\theta_x + \sin\theta_z \sin\theta_y \cos\theta_x)$$

$$+ \cos\theta_y \cos\theta_x \qquad 152\text{—}\!\!\!\!/$$

and $x_i'$ and $y_i'$ from the perspective corrected image are given by:

$$x_i' = \widehat{x}_i / \widehat{w}_i \quad \text{and} \quad y_i' = \widehat{y}_i / \widehat{w}_i$$

$$\underbrace{\phantom{x_i'}}_{154} \qquad\qquad \underbrace{\phantom{y_i'}}_{156}$$

Therefore we can write:

$$F_{xi}(\theta_z, \theta_y, \theta_x, f) - x_i' = 0 \quad /\text{—}158$$

Taking:

$$t = [\theta_x \ \theta_y \ \theta_z \ f] \quad /\text{—}160$$

We can write:

$$-F(t) = \begin{bmatrix} x_o - F_{x_o}(\theta_z, \theta_y, \theta_x, f) \\ y_o - F_{y_o}(\theta_z, \theta_y, \theta_x, f) \\ \cdot \\ \cdot \\ x_i - F_{x_i}(\theta_z, \theta_y, \theta_x, f) \\ y_i - F_{y_i}(\theta_z, \theta_y, \theta_x, f) \end{bmatrix} \bigg/ 162$$

FIG._10D

Newton's Method

By Newton's method of numerical computation, t is an estimate of the values $$[\theta_x \quad \theta_y \quad \theta_z \quad f]$$

then:

$$t_{new} = t - J^{-1}F(t) \quad \text{— 166}$$

is a better estimate of the values.

Where $J^{-1}$ is the matrix of partial derivatives:

$$J_{i,j} = \frac{\partial F_i}{\partial t_j} \quad \text{— 164}$$

FIG._10E

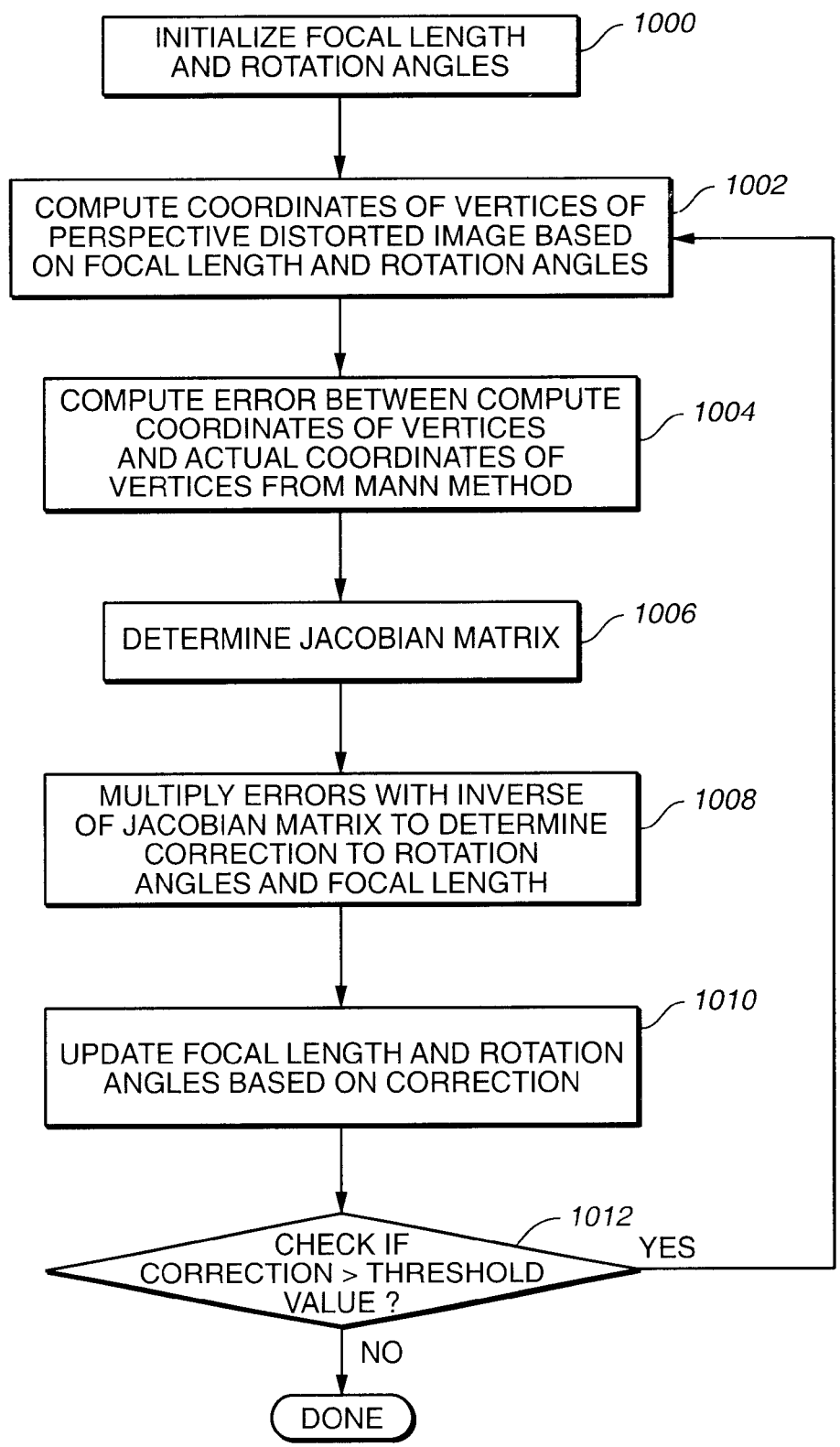
FIG._11

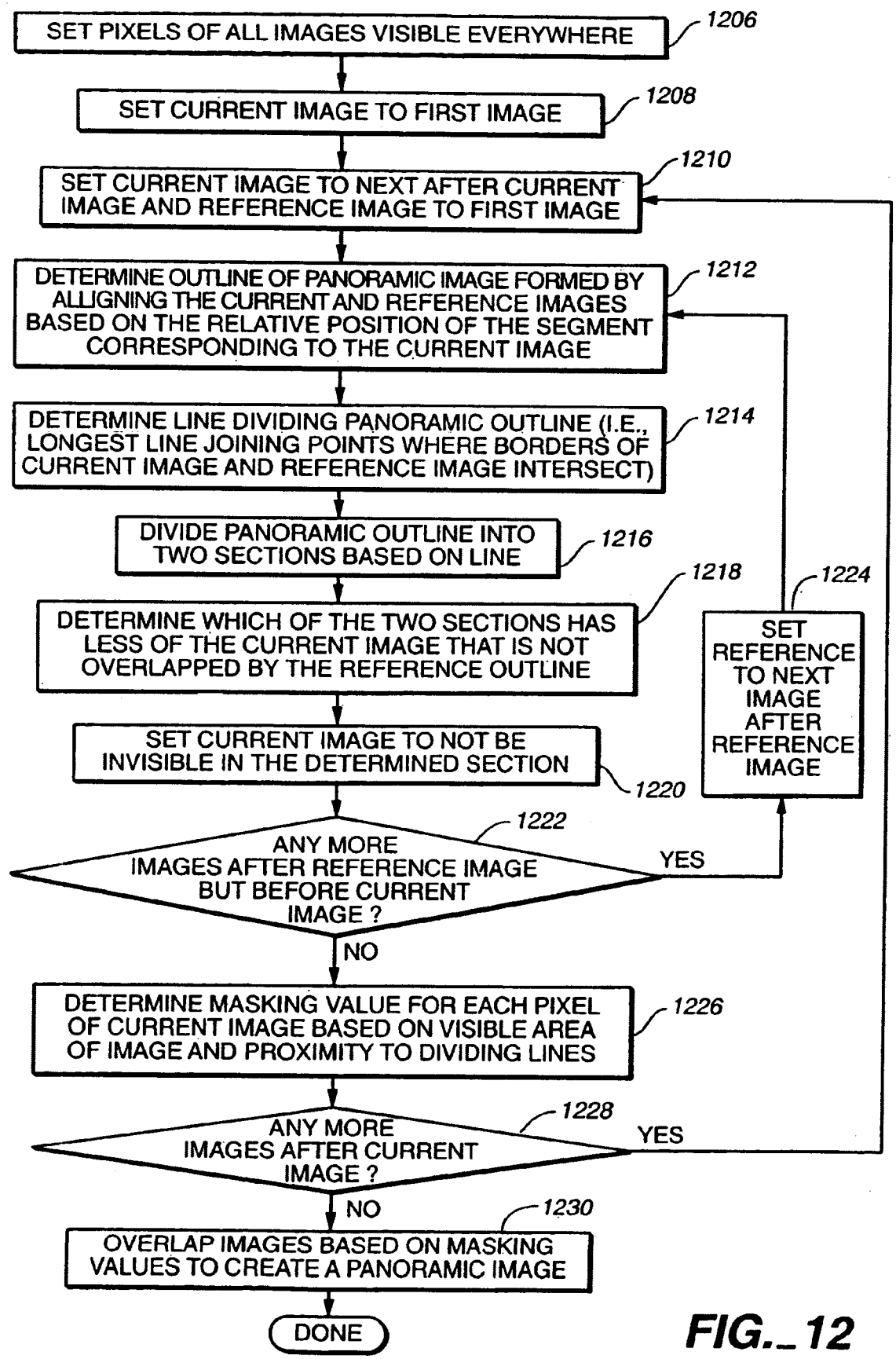
FIG._12

PROJECTING IMAGES ONTO A SURFACE

TECHNICAL FIELD

This invention relates to projecting images onto a surface.

BACKGROUND

Image capture devices, such as cameras, can be used to capture an image of a section of a view, such as a section of the front of a house. The size of the section of the view captured by a camera is known as the field of view of the camera. Adjusting a lens associated with a camera may increase the field of view. However, there is a limit beyond which the field of view of the camera cannot be increased without compromising the quality, or resolution, of the captured image.

It is sometimes necessary to capture an image of a view that is larger than can be captured within the field of view of a camera. To do so, multiple images of different segments of the view can be taken and then the images can be joined together ("merged") to form a composite image, known as a panoramic image. The camera is oriented in a different direction for each of the images to capture images of the different segments of the view, and the orientation of the camera is selected so that the captured images overlap each other. The images of the different segments are typically projected onto a surface, such as a cylinder, a sphere or a plane, before they are merged together to form a panoramic image.

An image captured by a camera distorts the sizes of objects depicted in the image so that distant objects appear smaller than closer objects. The size distortion, which is known as perspective distortion, depends on the camera position, the pointing angle of the camera, and so forth. Consequently, an object depicted in two different images might not have the same size in the two images, because of perspective distortion.

SUMMARY

In general, one aspect of the invention relates to a method that includes determining the orientation of a camera associated with a first image based on a shape of a perimeter of a corrected version of the first image. The corrected version of the first image has less perspective distortion relative to a reference image than the first image. The shape of the perimeter of the corrected version of the first image is also different from the shape of the perimeter of the first image. The first image is then projected onto a surface based on the orientation of the camera.

In general, another aspect of the invention relates to an article comprising a machine-readable medium on which are tangibly stored machine-executable instructions. The stored instructions are operable to cause a machine to perform the method of the first aspect of the invention.

Embodiments of the invention may include one or more of the following features. A focal length of a camera associated with the first image is determined based on the shape of the perimeter of the corrected version of the first images. The step of projecting the first image is further based on the focal length. An orientation of a camera associated with a second image is determined based on a shape of a perimeter of a corrected version of the second image. The second image is then projected onto the surface based on the orientation of the camera associated with the second image. The reference image, and a three-dimensional object are also projected onto the surface and merged with the projected first image to form a panoramic image. The surface onto which the images are projected may shaped, for example, as a cylinder, sphere or plane.

The focal length and rotation angle are determined in the following manner. Initial values for the orientation and the focal length are selected. The initial value for the orientation is, for example, selected to be the same as the orientation of a camera associated with the reference image. The orientation is typically represented as a series of rotation angles of the camera relative to the orientation of the reference image. The initial value for the focal length is selected from a measurement of the image, such as the sum of a length and a width of the image.

The accuracy of the selected values is improved as described below. The selected orientation and focal length are used to estimate the shape of the perimeter of the corrected version of the first image. The estimated shape and the actual shape of the perimeter of the corrected version of the first image are then compared. The selected values of the orientation and the focal length are adjusted based on a difference between the estimated shape and the actual shape of the perimeter of the corrected version of the first image, for example, using Newton's method.

Differences between the selected values of the orientation and the focal length and the adjusted values of the orientation and the focal length are then computed. If the differences are below a threshold value, the adjusted value of the orientation and the adjusted value of the focal length are determined to be the actual orientation and the actual focal length. Otherwise, if the computed difference is not below the threshold value, the adjusted values of the orientation and the focal length are selected as the values of the orientation and the focal length. The process of improving the accuracy of the selected values of the orientation and the focal length is then repeated.

The reference image is an image of a reference segment of a view and the first image is an image of a first segment of the view that overlaps the reference segment of the view. A position offset of the first segment of the view relative to the reference segment of the view is determined. Perspective distortion in the first image relative to the reference image is then corrected based on the position offset to generate the corrected version of the first image.

The perimeter of the first image includes two reference points and correcting for perspective distortion alters the shape of the perimeter of the first image by moving one of the reference point relative to the other reference point. The reference points are typically vertices defined by the shape of the perimeter of the first image. The shape of the perimeter of the first image is rectangular and correcting for perspective distortion alters the shape of the perimeter of the first image into a trapezoid.

In certain applications, the orientation of the camera associated with the first image is also based on the shape of the perimeter of the first image. Such applications are, for example, used when the first image and the reference image are of different sizes or shapes.

Among other advantages, determining the rotation angle and the focal length of the images allows the images to be mapped, for example, onto a cylinder before the images are blended into a panoramic image. The panoramic images formed by blending the images that have been mapped onto a cylinder have less distortion than a panoramic image that is not mapped before the images are blended. The invention allows the rotation angle and the focal length of the images to be determined without requiring any additional information about the view captured in the image besides the information in the images. By using the alteration in the perimeter of the image to compute the rotation angle and focal length, the computing resources and computing time required is reduced.

The details of one or more embodiments of the invention are set forth in the accompanying drawings and the description below. Other features, and advantages of the invention will be apparent from the description and drawings, and from the claims.

DESCRIPTION OF DRAWINGS

FIG. 1 is a block diagram of a computer system for merging images;

FIGS. 2A and 2B show user interfaces presented by the system of FIG. 1;

FIG. 3 shows the relationship between perspective distortion, the rotation angle, and the focal length;

FIG. 4 is a flow chart of the process performed by the system of FIG. 1 to merge the images, including determining relative positions of the images, correcting perspective distortion in the images, and determining the focal length and rotation angles of the images;

FIG. 5A illustrates the use of the focal length and the rotation angle to map images onto a cylinder;

FIG. 5B illustrates the use of the focal length and the rotation angle to incorporate a computer generated 3-dimensional object into a panoramic image;

FIGS. 6A–6F illustrate intermediate steps in merging images;

FIGS. 7A and 7B are flow charts of the process performed by the system to determine the relative positions of the images;

FIG. 8 is a flow chart of the process performed by the system to correct perspective distortion in the images;

FIG. 9 shows images that are in the process of being positioned relative to each other;

FIG. 10A shows the conversion of two-dimensional coordinates into four-dimensional coordinates;

FIG. 10B is a flow chart of the process performed by the computer system of FIG. 1 to compute the vertices of a perspective distorted image based on rotation angles and focal lengths; FIGS. 10C–10E show the equations terminology used to compute the focal length and rotation angles of an image;

FIG. 11 is a flow chart of the process performed by the system to compute the focal length and the rotation angle of an image; and FIG. 12 is a flow chart of a process performed to merge images.

DETAILED DESCRIPTION

As shown in FIG. 1, a system for obtaining and merging images 11 includes a computer 12, a digital camera 20 to capture digital images 11 and load them onto the computer 12, a display 14 for displaying the images and a printer 22 for printing them. Each of the images 11 depict overlapping segments of a view that is common to all of them and the computer 12 merges the images to create a panoramic image of the view. For example, each of the images 11 may represent a segment of the skyline of a city and the computer 12 may merge the images to form a panoramic image of the entire skyline. In forming the panoramic images, the images 11 are positioned relative to each other to form a seamless continuous image. For example, some of the images 11 may be positioned side-by-side, vertically, or diagonally relative to each other.

Each of the images 11 is with the camera 20 pointed in a particular orientation and with the camera set at particular focal length. The orientation of the camera can be represented as a set of rotation angles from a reference orientation. As will be described in greater detail below, the computer 12 computes the focal length and the rotation angles for each of the images and uses the computed information to create the panoramic image. By using the focal length and the rotation angles, the computer 12 reduces the amount of distortion in the panoramic image. The computed information can also be used to incorporate a three-dimensional objected generated by the computer 12 into the panoramic image.

As shown in FIG. 2A, the computer 12 presents a user interface 70 to a user to allow the user to upload images 11 from the camera 20 to the computer 12 through the input interface 49. The user may upload images to the user interface 70 by clicking on an add button 72. The user interface 70 displays images 11a–11d that have been uploaded to the user interface 70. The images 11a–11d depict overlapping segments of a view of a lake. The user directs the computer 12 to create a panoramic image from the uploaded images by clicking on a create button 76.

In response, the images 11a–11d are conveyed to the image stitching software 48. Image stitching software 48 merges the images 11a–11d to form a panoramic image of the entire view of the scene, which it presents to the user in a user interface 80 (FIG. 2B) displayed on monitor 14. The user may also print the panoramic image on printer 22.

As shown in FIG. 2B, user interface 80 contains a panoramic image 82 created by image stitching software 48 from the images 11a–11d. The user interface 80 also includes a download button 84 that the user can click on to save the panoramic image on the computer 12. Additionally, the user interface 80 contains a hyperlink 86 that the user may click to order a full-resolution glossy print of the image from a remote server.

As shown in FIG. 1, computer 12 includes a processor 32 for executing programs and a storage subsystem 34 for storing information such as data or computer programs. The storage subsystem may include a hard disk, a hard disk array, a CD-ROM drive, a floppy drive or random access memory. The software stored in storage subsystem 34 and executed by the processor 32 includes image input interface 49 for receiving images 11 from digital camera 20 and image-stitching software 48 for merging images. Image input interface 49 may be a dynamically linked library ("DLL") that conforms with the TWAIN ("Technology Without An Interesting Name") standard for linking applications and image acquisition devices. The TWAIN working group promulgates the TWAIN standard.

Image stitching software 48 includes a positioning module 50 for determining an offset by which one image should be translated relative to another to position an object depicted in both images at the same location of the panoramic image. Image stitching software 48 also includes a perspective corrector 52 for correcting perspective distortion in the images, a computing module 54 for computing the rotation angle and focal length of an image, a cylindrical projector 56 for projecting the images onto a cylindrical surface and an image blender 58 for blending the projected images together. Image stitching software 48 also includes a three-dimensional object incorporator 60 that may be used to incorporate a three-dimensional object onto a panoramic image. The image stitching software will be described in greater detail below.

Referring to FIG. 3, the process of capturing and merging images 11 (FIG. 1) will be described with reference to two images 11*a*, 11*b* that do not overlap, although the process is typically applied to overlapping images. Image 11*a*, which is typically a rectangular array of pixels, is captured with the camera 20 pointed in a first orientation. Image 11*a* corresponds to a projection of a corresponding segment of the view onto an image plane 104 that is separated from the camera 20 by a distanced known as the focal length of the camera. The camera is then reoriented by rotating it through rotation angles $\theta_x$, $\theta_y$, and $\theta_z$ and a second image 11*b* is captured. Image 11*b* is also typically a rectangular array of pixels. Because of the reorientation of the camera, image 11*b* correspond to a projection of a different segment of the view onto a different plane that is rotated from the first plane 104.

As shown in FIG. 4, upon receiving (200) the images 11*a* and 11*b*, positioning module 50 determines (202) the offset (in pixels) of one of the images relative to other, as will be described in greater detail below. Perspective corrector 52 (FIG. 1) maps image 11*b* onto the plane 104 of the image 11*a*, thereby correcting (204) perspective distortion in the image 11*b* relative to the image 11*a*. The correction of perspective distortion alters the shape of the rectangular perimeter of the image 11*b* resulting in a corrected image 106 that has a trapezoidal perimeter. The shape of the trapezoidal perimeter of the image 106 depends on the focal length f and on the rotation angles $\theta_x$, $\theta_y$, and $\theta_z$ of the camera. Computing module 54 (FIG. 1) computes (206) the focal length f and rotation angles $\theta_x$, $\theta_y$, and $\theta_z$ associated with image 11*b* based on the shape of the trapezoidal perimeter of the corrected image 106.

As shown in FIG. 5A, cylindrical projector 56 uses the focal length f and rotation angles $\theta_x$, $\theta_y$, and $\theta_z$ associated with image 11*b* to map (208) images 11*a* and 11*b* onto a cylinder 110 as described in greater detail below. The mapping produces cylindrically mapped images 112 and 114, which have less distortion than the image 106 (FIG. 3) created by mapping image 11*b* onto plane 104. Image blender 58 blends (210) the mapped images 112 and 114 to form the panoramic image.

Alternatively, as shown in FIG. 5B, three-dimensional object incorporator 60 may use the computed focal length f and rotation angles $\theta_x$, $\theta_y$ and $\theta_z$ associated with image 11*b* to incorporate a computer generated three-dimensional object 120 into the panoramic image. The computed information is used to position the images 11*a* and 11*b* in a three-dimensional coordinate system. Three-dimensional object incorporator 60 positions the computer-generated object 120 in the three-dimensional system and projects object 120 to plane 104. Image blender 58 blends the images 11*a*, 106, 122 to form a panoramic image.

Determining Relative Positions

As shown in FIGS. 6A and 6B, the positioning module 50 uses a two-image positioner 63 to determine how much a first image 80*a* needs to be moved relative to a second image 80*b* so that a certain object depicted in both of the images 80*a*, 80*b* has its depiction in the second image 80*a* on top of its depiction in the first image 80*b*. In FIG. 6A, the image 80*b* must be moved 68 pixels to the right and 2 pixels upwards so that a branch 82 which is depicted in both image 80*a*, 80*b* has its depiction in the second image 80*b* on top of its depiction in the first image 80*a*. This ensures that the two images 80*a*, 80*b* are positioned so that the images 80*a*, 80*b* continue into each other seamlessly.

The two-image positioner 63 determines the relative position ("offset") of the two images, for example, based on the cross-spectrum method described in "Direct Estimation of Displacement Histograms," proceedings of the OSA meeting on image understanding and machine vision, June 1989, Bemd Girod and David Kuo ("Girod"), the disclosure of which is incorporated by reference in this specification. The Girod method returns a probability density function (see FIG. 3 of Girod) that has a peak at the value of the relative displacement. Two-image positioner 63 determines the relative position by first finding the location of the peak, which gives the magnitude of the relative position. Two-image positioner 63 also finds the highest value of the probability density function that is outside a five-pixel radius of the peak, and computes a confidence value in the relative position based on the ratio of the highest value outside the five-pixel radius and the value of the peak.

Although Girod discloses how to compute the relative distances the two images have to be moved, Girod's method does not determine the direction that the images have to be moved relative to each other. Consequently, after performing the Girod method, there are four possible relative positions depending on whether the image is moved to the left and up, left and down, right and up, or right and down. To determine the direction that the images have to be moved relative to each other, the two-image positioner determines a pair of overlapping segments 88*a*, 88*b* of the two images 80*a*, 80*b* for each of the possible relative positions. For each pair of determined overlapping segments, the two-image positioner computes the correlation between the overlapping segments according to the formula:

$$q = \frac{E(p_0 p_1) - E(p_0)E(p_1)}{\sqrt{E(p_0^2) - E(p_0)^2} \sqrt{E(p_1^2) - E(p_1)^2}}$$

where:

$E(p_0)$ is the average value of the pixels in the first image segment 88*a*;

$E(p_1)$ is the average value of the pixels in the first image segment 88*b*;

$E(p_0^2)$ is the average of the square of the values of the pixels in the first segment 88*a*;

$E(p_1^2)$ is the average of the square of the values of the pixels in the second segment 88*b*; and $E(p_0 p_1)$ is the average of the product of the values of overlapping pixels of the first segment 88*a* and the second segment 88*b*.

and q is the correlation of the two image segments.

The actual relative position of the first image 80*a* relative to the second image 80*b* yields the greatest value for the correlation, q. Relative positions that yield very small overlapping segments are discarded because the correlation for the small segments is likely to yield false positive results.

The two-image positioner repeats the process described above for each pair of the images 80*a*–80*f* to yield "adjacent lists" 86*a*–86*f*, which contain the relative positions of the images. For example, from the adjacent list 86*a*, the image 80*b* must he moved 68 pixels to the left and two pixels upwards relative to image 80*a*. Similarly, from the adjacent list 86*b*, image 80*a* must be moved 68 pixels to the right (from the negative sign) and two pixels downwards (from the negative sign) relative to image 80*b*, while image 80*c* must be moved 69 pixels to the left and 4 pixels upwards relative to image 80*b*. Based on the relative positions of the pairs of images, the multiple image positioner 62 determines how the images should be translated relative to each other to form the panoramic image, as will be described below.

As shown in FIGS. 7A and 7B, the process performed by the multiple-image positioning module 62 to position the images relative to each other begins when the multiple-image positioning module 62 creates (702) an empty "positioned list" for storing images whose translation in pixels relative to the other images has been determined. The multiple-image positioning module 62 checks (704) the input interface 49 to determine whether any images have been received that are not on the "positioned list." If no images have been received then the multiple-image positioning module 62 stops the process. Otherwise, if an unpositioned image has been received, the multiple-image positioning module 62 checks (706) if the positioned list is empty. If the positioned list is empty, the multiple-image positioning module 62 adds (708) the unpositioned image to the positioned list, since there are no images to position the image relative to, and checks (704) if there are any other unpositioned images.

Otherwise, if the positioned list is not empty, multiple-image positioning module 62 creates (710) an empty "overlap list" for storing images from the positioned list which overlap the unpositioned image. The multiple-image positioning module 62 then begins the process of determining the overlapping images by setting (712) a best_confidence value to zero, a best_confidence_image to NO MATCH, and a current image to the first image in the positioned list. The best_confidence_image represents the image that the process considers most likely to overlap the unpositioned image, while the best_confidence value is a statistical measure of confidence that the best_confidence_image overlaps the unpositioned image. Since multiple-image positioning module 62 has not found an image that overlaps the unpositioned image when the overlap list is empty, the best_confidence_image and the best_confidence are initially set (712) as described.

The two-image positioner 60 then determines (714) the relative position ("offset") of the unpositioned image relative to the current image and a confidence value for the offset, as previously described with reference to FIGS. 6A–6C. The multiple-image positioner 62 then checks (716) if the confidence value is greater than a threshold confidence value which must be met by overlapping images. If it is not, then the multiple-image positioner 62 checks (724) whether the current image is the last image in the positioned list. Otherwise, if the confidence value is greater than the threshold confidence value, the multiple-image positioner 62 adds (718) the current image, its position offset, and the confidence value of the position offset to the overlap list. The multiple-image positioner 62 checks (720) if the confidence value is greater than the best_confidence value. If it is not, the multiple-image positioner 62 checks (724) if the current image is the last image in the positioned list. Otherwise, if it is, the multiple-image positioner 62 makes the current image the best_confidence image by setting (722) the best_confidence_image to be the current image and the best_confidence value to be the confidence value of the current image.

The multiple-image positioner 62 then checks (724) whether the current image is the last image in the positioned list. If it is not, the multiple-image positioner 62 sets (726) the current image to be the next image in the positioned list and repeats the processes (714–724) for the new current image. Thus, the multiple-image positioner 62 and the two-image positioner 63 determine the relative positions of the unpositioned image relative to the positioned images while keeping track of a confidence value for the relative positions.

Otherwise, if the current image is the last image in the list, the multiple-image positioner 62 sets (728) a reference image to be the first image in the overlap list and checks (750) whether the reference image is the last image in the overlap list. If the reference image is the last image, the multiple-image positioner 62 appends (762) the unpositioned image to an "adjacent list" of images that are adjacent to reference image along with the position of the unpositioned image relative to the reference image, which is given by the negative of the positioned offset. Otherwise, if the reference image is not the last image in the overlap list, the multiple-image positioner 62 determines whether the unpositioned image connects two previously disjoint sets of images as will described below. For example, as shown in FIG. 9, the multiple-image positioner 62 may have determined that images 80*a* and 80*b* are positioned adjacent to each other and that images 80*d* and 80*f* are connected to each other by image 80*e*, resulting in two disjoint sets 80*a*, 80*b* and 80*d*–80*f* of images. The following steps would determine that a new image 80*c* is positioned adjacent to images 80*b*, 80*d* from the two sets and, therefore, joins the previously disjoint set of images to create one set 80*a*–80*f* of connected images.

The multiple-image positioner 62 begins by checking (750) if the reference image is the last image in the overlap list. If it is the last image, the multiple-image positioner 62 appends (762) the unpositioned image to the "adjacent list" of images that are adjacent to the reference image. Otherwise, if it is not the last image in the overlap list, the multiple-image positioner 62 sets (751) the current image to be the next image in the overlap list after the reference image. The multiple-image positioner 62 then checks (752) if the adjacent lists of the reference image and the current image indicate that the reference and current images are adjacent to each other. If the adjacent lists do indicate that they are adjacent, the multiple-image positioner 62 checks (758) whether the current image is the last image in the overlap list. Otherwise, if the adjacent lists do not indicate that the two images are adjacent, the multiple-image positioner 62 translates (754) the current image and all the images that are connected to it relative to the reference image based on the offsets of the current image and the reference image relative to the unpositioned image. Thus, the multiple-image positioner 62 uses the positions of the current image and the reference image relative to the unpositioned image to position the current image and the reference image relative to each other. The multiple-image positioner 62 then appends (756) the unpositioned image to the "adjacent list" of images that are adjacent to the current image.

The multiple-image positioner 62 then checks (758) if the current image is the last image in the overlap list. If it is not, the multiple-image positioner 62 sets (760) the current image to be the next image in the overlap list and checks (752) if the adjacent lists indicate that the new current image is connected to the reference image. Thus, the multiple-image positioner 62 goes through the overlap list connecting sets of images that were previously disjoint from the reference image but are now connected to the reference image by the unpositioned image.

The multiple-image positioner 62 then appends (762) the unpositioned image to the "adjacent list" of images that are adjacent to the reference image and checks (764) whether the reference image is the last image in the overlap list. If the reference image is not the last image in the overlap list, the multiple-image positioner 62 sets (766) the reference image to be the next image after the reference image. The process of steps (750–764) is repeated for the new reference image to determine which disjointed sets of images are connected by the unpositioned image and to add the unpositioned image to the adjacent lists of images that are adjacent to the positioned image.

The multiple-image positioner 62 checks (768) whether the best_confidence value is greater than zero to determine whether an overlapping image was found in the process (712–724) that was described above. If the best_confidence value is less than or equal to zero, the multiple-image positioner 62 adds (772) the images in the overlap list and their offsets to the adjacent list of the unpositioned image, to keep a permanent record of the images that are adjacent to the unpositioned image. Otherwise, the multiple-image positioner 62 translates (770) the unpositioned image relative the best_confidence_image based on the position offset of the best_confidence image. By translating the unpositioned image based on the positional offset that is most certain, the multiple-image positioner 62 moves the unpositioned image to its most likely position. The multiple-image positioner 62 adds (772) the images in the overlap list and their offsets to the adjacent list of the unpositioned image, to keep a permanent record of the images that are adjacent to the unpositioned image and adds (774) the unpositioned image to the positioned list.

The multiple-image positioner 62 then checks (704) whether there are other images that have not been relatively positioned, and processes (706–774) subsequent unpositioned images as described above. The process of FIGS. 7A and 7B determines the relative positions of the images without the intervention of a human operator.

Correcting Perspective Distortion

Multiple-image corrector 66 (FIG. 1) of the perspective corrector 52 selects pairs of images to be corrected, as will be described below, and two-image corrector 64 corrects for perspective in one of the images relative to the other. Two-image corrector 64 uses, for example, the virtual bellows method of perspective correction described in "Virtual Bellows: High Quality Stills from Video," proceedings of the first IEEE international conference on image processing, November 1994, Steve Mann and Rosalind Picard ("Mann"), the disclosure of which is incorporated by reference in this specification. Thus, perspective corrector 52 corrects perspective distortion in the images 80a–80f (FIG. 6B) to yield trapezoidal corrected images 90a–90e (FIG. 6D). The multiple image corrector 66 also arranges the images in the order in which they should be blended as will be described later.

As shown in FIG. 8, multiple-image corrector 66 corrects perspective distortion in the images in a process that begins by determining (802) the most centrally positioned of the images ("centermost image") based on the relative positions stored within the adjacent lists created by the multiple-image positioner 62 (756, 772 FIG. 7B). For example, in FIG. 6B, the centermost image may be 80c. The multiple-image corrector 66 does not correct perspective distortion in the centermost image, but instead corrects perspective distortion of the other images relative to the centermost image by mapping the other images onto the plane of the centermost image.

The multiple-image corrector 66 creates (804) a list of images whose perspective distortion has been corrected ("list of corrected images") that includes only the centermost image. The multiple-image corrector 66 also creates (806) a list of images whose perspective distortion has not been corrected ("list of uncorrected images") that includes all of the images 80a, 80b, 80d–80f (FIG. 6B). The multiple-image corrector 66 then initializes the correction process by setting (808) the value of the maximum overlap area ("max_overlap_area") to zero, the image from the corrected list that will be used in perspective correction ("selected_warped") to be undefined, and the image whose perspective is to be corrected ("selected_unwarped") to also be undefined.

The multiple-image corrector 66 then sets (810) the current_warped image to be the first image in the corrected list and the current_unwarped image to be the first image in the uncorrected list. The multiple-image corrector 66 computes (812) an overlap area between the current warped image and the current_unwarped image, based on the relative positions (from the adjacent lists) and the sizes of the two images. The multiple-image corrector 66 checks (814) if the overlap area is greater than max_overlap_area. If it is not, the multiple image corrector 66 checks (818) if there are any more images in the corrected list. Otherwise, if the overlap area is greater than max_overlap_area, the multiple-image corrector 66 changes (816) the images that will be used in perspective correction by setting max_overlap_area to be the overlap area, setting the selected warped image to be the current_warped image, and setting the selected_unwarped image to be the current_unwarped image.

The multiple-image corrector 66 then checks (818) if there are any more images in the corrected list. If there are more images, the image corrector sets (820) the current_warped image to be the next image in the corrected list and repeats the process (812–820) of conditionally changing the selected images. Thus, the image corrector 66 identifies the corrected image that most overlaps the current_unwarped image.

The multiple-image corrector 66 then checks (822) if there are any more images in the uncorrected list. If there are more images in the uncorrected list, the multiple-image corrector 66 sets (824) the current_unwarped image to be the next image in the uncorrected image and sets the current_warped image to be the first image in the list of corrected images. The multiple-image corrector 66 repeats the process (812–824) of changing the selected images to identify a corrected and an uncorrected image that overlap each other more than any other corrected and uncorrected images.

If there are no more images in the uncorrected list, the multiple-image corrector 66 checks (826) if max_overlap_area is greater than zero. If max_overlap_area is not greater than zero, no overlapping images were identified and the multiple-image corrector 66 terminates the process. Otherwise, if max_overlap_area is greater than zero, multiple-image corrector 66 corrects (828) the perspective of the selected_unwarped image based on its position relative to the selected warped image. The multiple-image corrector then moves (830) the selected_unwarped image from the list of uncorrected images to the list of corrected images and repeats the process (808–830) of correcting perspective distortion in the uncorrected image that most overlaps a corrected image. Thus the multiple-image corrector 66 corrects the perspective distortions of the images by selecting the uncorrected image that most overlaps a corrected image and correcting its distortion based on its position relative to the corrected image. The process of FIG. 8 results in realistic corrections of perspective distortion and can be performed without the intervention of a human operator.

Computing Focal Lengths and Rotation Angles

As shown in FIGS. 10A and 3, each of the vertices of the image 11b can be assigned a two-dimensional coordinate for determining the position of the vertices. The first dimension x gives the horizontal position of the vertex, while the second dimension y gives the vertical position of the vertex. To represent the position of the vertex in the direction of the displacement of the image plane 104 from the camera 20, the two-dimensional coordinates are converted into a four-dimensional coordinate system 132. The first and second dimensions of the four-dimensional coordinate system 132 are the same as the first and second dimensions of the two-dimensional coordinate system. The third dimension z of the coordinate system 132 represents the distance from the vertex to the camera 20, while the fourth dimension w represents the perspective scaling of objects with distance from the camera 20.

As shown in FIG. 10B, the mapping of image 11b onto the plane 104 can also be computed in the four-dimensional system 132 when the focal length and rotation angles are known. The process begins by translating the vertices 134 away from the camera by along the z axes by a distance given by the focal length of the camera. Such a translation may be represented by multiplying the four-dimensional coordinates 132 of the vertices 4 with the matrix 136 (FIG. 10C). The translated image is then rotated (902) about the z axis by a rotation angle $\theta_z$ corresponding to a change in the orientation of the camera along the z axes. The image is also rotated (904, 906) about the y axis and the x axis by angles corresponding to the change in orientation of the camera along those two axes. Matrices 138, 140, and 142 (FIG. 10C) represent the rotations about the z, y, and x axes. Multiplying the coordinates of the translated vertices with the rotation matrices 138, 140, 142 rotates the vertices.

The vertices are translated (908) back towards the camera 20 by a distance equal to the focal length of the camera, as represented by the matrix 144 (FIG. 10C). The vertices are then distorted (910) by multiplying their coordinates with a distorting matrix 146 to duplicate the effect of perspective distortion. As shown in equation 150 of FIG. 10D, the mathematical transformations of FIG. 10B result in a new set 152 of four-dimensional coordinates for the vertices of image 10b.

The four-dimensional coordinates can be transformed into the original two-dimensional coordinate system using equations 152, 154, and 156. If the focal length and the rotation angles used in steps 900–910 (FIG. 10B) are correct then the two-dimensional coordinates from equations 154 and 156 should be the same as the coordinates of the vertices of image 106 (FIG. 3) which were computed using the Mann method described above. In other words, if the mathematical transformations for computing the vertices are written as functions of the rotation angles and the focal length, i.e, $F_{xi}$ ($\theta_z$, $\theta_y$, $\theta_x$, f) and $F_{yi}$ ($\theta_z$, $\theta_y$, $\theta_x$, f), then the difference between those functions and the actual coordinates of the vertices from the Mann method should be zero, as shown in equation 158.

However, if the rotation angles and the focal length are inaccurate estimates, there will be slight differences or errors between the computed coordinates of the vertices and the actual coordinates of the vertices from the Mann method. The accuracy of the estimated rotation angles and the focal length can be improved by correcting the estimates based on the errors in the coordinates of the vertices. One way of correcting the estimates is the Newton's iterative method, which is described below.

A vector t of the rotation angles and the focal length is defined as shown in equation 160 (FIG. 10D). A vector function F(t) of the difference or error between the computed coordinates and the actual coordinates can also be defined as shown in equation 162. A Jacobian matrix J is computed based on the partial derivatives of the vector function F(t) relative to the vector t as shown in equation 164 of FIG. 10E. According to Newton's method, the accuracy of the vector t of the rotation angles and the focal length can be improved by subtracting the product of the vector function F(t) and the inverse of the Jacobian matrix J from the current guess of the vector t, as shown in equation 166. The Jacobian matrix J can be computed using symbolic processing software, such as MATLAB by The Math Works Corporation of Natick, Mass. Since the Jacobian matrix is typically not a square matrix, its inverse can be obtained by the method of singular value decomposition.

As shown in FIG. 11, the process implemented by the angle and focal length determiner 54 begins by initializing (1000) the rotation angles and the focal length of the camera. The rotation angles are typically initialized to zero and the focal length of the camera is initialized to a length derived from the dimensions of the image, such as, the sum of the width and length of the image. The determiner 54 then computes (1002) the coordinates of the vertices of the perspective-distorted image 106 (FIG. 3) based on the current value of the rotation angles and the focal length. The determiner 54 then computes (1004) the error between the computed coordinates of the vertices and the actual coordinates of the vertices from the Mann method, described above.

The determiner 54 then determines (1006) the Jacobian matrix J and multiplies (1008) the Jacobian matrix with the errors to determine a correction for the estimated rotation angle and the focal length. The determiner 54 then updates (1010) the rotation angles and the focal length by subtracting the correction from the estimated rotation angles and focal length. However, the determiner 54 does not allow the magnitude of the updated rotation angle to be greater than:

$$\theta_{max} = \frac{\pi}{2} - \arctan\left(\frac{r_{max}}{f}\right)$$

where: $r_{max}$ is the radius of the smallest circle that encloses the images, known as the maximum radial size of the image. If the computed magnitude of the updated rotation angle is going to be greater than $\theta_{max}$, the determiner 54 reduces the magnitude of the rotation angle to $\theta_{max}$.

The determiner 54 then checks (1012) whether the magnitude of the correction is greater than a threshold value. If the magnitude of the correction is greater than the threshold value, the determiner 54 repeats the process (1002–1012) of improving on the estimated rotation angles and focal length. Otherwise, if the magnitude of the correction is less than a threshold value, the current estimate of the rotation angles and focal length is good enough and the process is terminated. Thus the determiner 54 reconstructs the focal length and rotation angles of the camera relative based on the changes to the vertices on the perimeter of the image.

Mapping onto Cylindrical Coordinates

As shown in FIG. 3 the four vertices of the perimeter of the image 11a are all in the plane 104. If the three-dimensional coordinates of the vertices are given by:

$$p_i = (x_i, y_i, z_i)$$

then the mathematical equation describing the plane 104 can be written as:

$$c_0 x_i + c_1 y_i + c_2 z_i = 1$$

where the coefficients $c_0$, $c_1$, and $c_2$ are given by:

$$c_0 = \frac{\begin{vmatrix} y_0 & z_0 & 1 \\ y_1 & z_1 & 1 \\ y_2 & z_2 & 1 \end{vmatrix}}{d}$$

$$c_1 = \frac{\begin{vmatrix} z_0 & x_0 & 1 \\ z_1 & x_1 & 1 \\ z_2 & x_2 & 1 \end{vmatrix}}{d}$$

$$c_2 = \frac{\begin{vmatrix} x_0 & y_0 & 1 \\ x_1 & y_1 & 1 \\ x_2 & y_2 & 1 \end{vmatrix}}{d}$$

$$d = \frac{\begin{vmatrix} x_0 & y_0 & z_0 \\ x_1 & y_1 & z_1 \\ x_2 & y_2 & z_2 \end{vmatrix}}{d}$$

As shown in FIG. 5A, the coordinates of the pixels of the mapped image are a, representing the position of the curved surface along the cylinder and h, representing the vertical position of the pixel. The equations shown below can be used to determine which pixel (x, y) in the planar image 11a should be mapped onto the coordinate position (a, h) on the cylindrically mapped image.

$$x = \frac{1}{c_0 + \frac{c_2}{\tan\alpha} + hc_1\sqrt{\frac{1}{\tan^2\alpha} + 1}}$$

$$z = \frac{x}{\tan\alpha}$$

$$y = \frac{1 - xc_0 - zc_2}{c_1}$$

The values of the pixel at the cylindrically mapped coordinate (a, h) can therefore be determined by retrieving the value of the corresponding pixel (x, y) in the planar image.

Blending the Images

As shown in FIG. 12, image blender 58 (FIG. 1) then sets (1206) a visible property of the pixels of all the images to indicate that all the pixels of all the images start as being visible. The stitching software then sets (1208) the current image to the first image 80a (FIG. 6A) and proceeds to determine the visible area of each of the images as described below.

The image blender 58 sets (1210) the current image to be the next image 80b after the current image 80a and sets the reference image to be the first image 80a. Thereby leaving all the pixels of the first image visible. Although all the pixels of the first image are set visible, some of the pixels of the first image may be obstructed or masked out by visible portions of subsequent images. as described later.

The dividing-line determiner 54 (FIG. 1) determines (1212) an outline 85 (FIG. 6F) of a composite image formed by aligning the current image and the reference image 80a (as previously described with reference to FIG. 6A). The dividing-line determiner 54 also determines a pair of points 87a, 87b where the outlines of the aligned images intersect, thereby defining (1214) a line 89 that joins the points 87a, 87b and divides (1216) the panoramic outline 85 into two sections 81, 83 (1216). If the outlines of the aligned images intersect at more than two points, the dividing-line determiner 54 selects the two intersection points that are furthest apart from each other to define the dividing line 89. The dividing-line determiner 54 then determines (1218) which one of the two sections 81, 83 has less of the current image 80b that is not overlapped by the reference image 80a and sets (1220) that section 87a of the current image 80b to be invisible. In the example of FIG. 6F, the section 83 has none of the current image that is not overlapped by the first image 80a. Consequently, the portions of the image profile 85 contained within the section 84 are set invisible, leaving the hashed section 82 of the image 80b visible.

The image blender 58 checks (1222) whether there are any more images between the reference image 80a and the current image 80b. If there are more images, the image blender 58 sets (1224) the reference image to be the next image after the current reference image and repeats the process of setting a section of the current image 80b invisible (1208–220) as described above. Otherwise, if there are no more images, the blending mask determiner 56 (FIG. 1) determines (1226) the pixels within the current image that will mask out pixels of earlier images. Only visible pixels 81 of the current image 80b mask out pixels of earlier images 80a. Consequently, the mask value of pixels contained within the region 81 is set to "1", while the mask property of pixels contained within the region 84 is set to "0".

After determining the mask values of the image, the image blender 58 checks (1228) whether there are any images after the current images. If there are more images, the stitching software sets (1210) a new current image to be the next image after the current image and proceeds to determine the mask values of the new current image (1212∝1226). The processing of subsequent images 80c–80f is preformed using the techniques that have been described above.

If there are no more images after the current image, the image blender 58 overlaps (1230) the images 80a–80f based on the masking value to create the panoramic image 94 (FIG. 6E). The section 81 of the second image 80b with a mask value of 1 is first composited on the first image, thereby obstructing the part of the first image that is to the right of the dividing line 89. The portions of the third image 80c with a mask value of 1 are then composited on the composite image from the first 80a and second 80b image to create another image, and so on, until the composite image 94 is created. Thus, image stitching software merges images 80a–80f depicting sections of a scene to create a panoramic image of the whole scene.

A number of embodiments of the invention have been described. Nevertheless, it will be understood that various modifications may be made without departing from the spirit and scope of the invention. For example, images 80a–80f to be blended maybe obtained from a scanned image. The positioning module may determine the relative positions of segments depicted in two images by prompting the user to use a pointing device to click on an object, such as the top left corner of the doorway, that is depicted in both of the images and determining the relative positions based on the positions that the user clicks on.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The invention has been described in terms of particular embodiments. Other embodiments are within the scope of the following claims. For example, the steps of the invention can be performed in a different order and still achieve desirable results. Certain steps described in the example above may be omitted in certain instances. For example, certain images may be merged without correcting perspective distortion in the images. Not all the same source images have to be the same size or shape.

The added three-dimensional object can be projected into a portion of the panoramic image that has been cut out for the image. Alternatively, the three-dimensional object can be projected on top of ("overlayed on") the panorama.

What is claimed is:

1. A method, comprising:
    receiving a reference image and a first image, the first image having a perimeter having a first shape;
    determining a relative position of the first image and the reference image;
    using the first image, the reference image, and the relative position to generate a first corrected image having less perspective distortion relative to the reference image than the first image has, the first corrected image having a perimeter having a first corrected shape different from the first shape;
    using the first corrected shape to determine a focal length and rotation angles of a camera associated with the first image; and
    projecting the first image on a surface based on the focal length and rotation angles of the camera associated with the first image.

2. The method of claim 1, further comprising:
    projecting the reference image on the surface.

3. The method of claim 2 further comprising:
    merging the projected reference image and the projected first image to form a panoramic image.

4. The method of claim 2 further comprising:
    projecting a three-dimensional object onto the surface;
    merging the projected three-dimensional object, the reference image and the first image to firm a panoramic image.

5. The method of claim 1 wherein the surface is cylindrical.

6. The method of claim 1 wherein the surface is spherical.

7. The method of claim 1 wherein the surface is planar.

8. The method of claim 1, further comprising:
    receiving a second image, the second image having a perimeter having a second shape;
    determining a relative position of the second image and the reference image;
    using the second image, the reference image, and the relative position to generate a second corrected image having less perspective distortion relative to the reference image than the second image has, the second corrected image having a perimeter having a second corrected shape different from the second shape;
    using the second corrected shape to determine a focal length and rotation angles of a camera associated with the second image; and
    projecting the second image on the surface based on the focal length and rotation angles of the camera associated with the second image.

9. The method of claim 1, wherein determining the focal length and rotation angles further comprises:
    selecting initial values for the rotation angles and the focal length; and
    improving the accuracy of the selected values of the rotation angles and the focal length by:
        estimating a shape of the perimeter of the corrected version of the first image based on the selected values of the rotation angles and the focal length;
        comparing the estimated shape and the actual shape of the perimeter of the corrected version of the first image;
        adjusting the selected values of the rotation angles and the focal length based on a difference between the estimated shape and the actual shape of the perimeter of the corrected version of the first image.

10. The method of claim 9, wherein improving the accuracy of the selected values of the rotation angles and the focal length further comprises:
    computing a difference between the selected values of the rotation angles and the focal length with the adjusted values of the rotation angles and the focal length;
    if the computed difference is below a threshold value:
        determining that the adjusted values of the rotation angles and the adjusted value of the focal length are the actual rotation angles and the actual focal length;
    otherwise, if the computed difference is not below the threshold value:
        selecting the adjusted values of the rotation angles and the focal length as the values of the rotation angles and the focal length; and
        repeating the step of improving the accuracy of the selected values of the rotation angles and the focal length.

11. The method of claim 9, wherein the initial value of the rotation angles is selected to be rotation angles of a camera associated with the reference image.

12. The method of claim 9 wherein the initial value of the focal length is selected based on a measurement of the first image.

13. The method of claim 12 wherein the selected initial value of the focal length is the sum of a length and a width of the image.

14. The method of claim 9 wherein a Newton's iteration is used to adjust the initial values of the rotation angle and the focal length.

15. The method of claim 1, wherein the rotation angles of the camera associated with the first image is measured relative to rotation angles of a camera associated with the reference image.

16. The method of claim 1 wherein the reference image is an image of a reference segment of a view and the first image is an image of a first segment of the view that overlaps the reference segment of the view, the method further comprising:

correcting for perspective distortion in the first image relative to the reference image to generate the corrected version of the first image.

17. The method of claim 16 further comprising:

determining a position offset of the first segment of the view relative to the reference segment of the view, wherein correcting for perspective distortion is based on the determined position offset.

18. The method of claim 16 wherein the perimeter of the first image includes at least a first reference point and a second reference point and correcting for perspective distortion alters the shape of the perimeter of the first image by moving the first reference point relative to the second reference point.

19. The method of claim 18 wherein the first and second reference points are vertices defined by the shape of the perimeter of the first image.

20. The method of claim 19 wherein the shape of the perimeter of the first image is rectangular and correcting for perspective distortion alters the shape of the perimeter of the first image into a trapezoid.

21. The method of claim 1, wherein determining the focal length and rotation angles is further based on the shape of the perimeter of the first image.

22. The method of claim 1 wherein the perimeter of the first image has the same shape as the perimeter of the reference image.

23. An article comprising a machine-readable medium on which are tangibly stored machine-executable instructions, the stored instructions being operable to cause a machine to:

receive a reference image and a first image, the first image having a perimeter having a first shape;

determine a relative position of the first image and the reference image;

use the first image, the reference image, and the relative position to generate a first corrected image having less perspective distortion relative to the reference image than the first image has, the first corrected image having a perimeter having a first corrected shape different from the first shape;

use the first corrected shape to determine a focal length and rotation angles of a camera associated with the first image; and project the first image on a surface based on the focal length and the rotation angles of the camera associated with the first image.

24. The article of claim 23 wherein the instructions further cause the machine to:

project the reference image on the surface.

25. The article of claim 24 wherein the instructions further cause the machine to:

merge the projected reference image and the projected first image to form a panoramic image.

26. The article of claim 24 wherein the instructions further cause the machine to:

project a three-dimensional object onto the surface;

merge the projected three-dimensional object, the reference image and the first image to form a panoramic image.

27. The article of claim 23 wherein the surface is cylindrical.

28. The article of claim 23 wherein the surface is spherical.

29. The article of claim 23 wherein the surface is planar.

30. The article of claim 23, wherein the instructions further cause the machine to:

receive a second image, the second image having a perimeter having a second shape;

determine a relative position of the second image and the reference image;

use the second image, the reference image, and the relative position to generate a second corrected image having less perspective distortion relative to the reference, image than the second image has, the second corrected image having a perimeter having a second corrected shape different from the second shape;

use the second corrected shape to determine a focal length and rotation angles of a camera associated with the second image; and project the second image on the surface based on the focal length and rotation angles of the camera associated with the second image.

31. The article of claim 23, wherein determining the focal length and rotation angles further comprises:

selecting initial values for the rotation angles and the focal length; and improving the accuracy of the selected values of the rotation angles and the focal length by:

estimating a shape of the perimeter of the corrected version of the first image based on the selected values of the rotation angles and the focal length;

comparing the estimated shape and the actual shape of the perimeter of the corrected version of the first image;

adjusting the selected values of the rotation angles and the focal length based on a difference between the estimated shape and the actual shape of the perimeter of the corrected version of the first image.

32. The article of claim 31, wherein improving the accuracy of the selected values of the rotation angles and the focal length further comprises:

computing a difference between the selected values of the rotation angles and the focal length with the adjusted valves of the rotation angles and the focal length;

if the computed difference is below a threshold value:

determining that the adjusted values of the rotation angles and the adjusted value of the focal length are the actual rotation angles and the actual focal length;

otherwise, if the computed difference is not below the threshold value:

selecting the adjusted values of the rotation angles and the focal length as the values of the rotation angles and the focal length; and repeating the step of improving the accuracy of the selected values of the rotation angles and the focal length.

33. The article of claim 31, wherein the initial value of the rotation angles is selected to be rotation angles of a camera associated with the reference image.

34. The article of claim 31 wherein the initial value of the focal length is selected based on a measurement of the first image.

35. The article of claim 34 wherein the selected initial value of the focal length is the sum of a length and a width of the image.

36. The article of claim 31 wherein a Newton's iteration is used to adjust the initial values of the rotation angle and the focal length.

37. The article of claim 23, wherein the rotation angles of the camera associated with the first image is measured relative to rotation angles of a camera associated with the reference image.

38. The article of claim 23 wherein the reference image is an image of a reference segment of a view and the first image is an image of a first segment of the view that overlaps the reference segment of the view, the instructions further causing the processor to:

correct for perspective distortion in the first image relative to the reference image to generate the corrected version of the first image.

39. The article of claim 38 wherein the instructions further cause the machine to:

determine a position offset of the first segment of the view relative to the reference segment of the view, wherein correcting for perspective distortion is based on the determined position offset.

40. The article of claim 38 wherein the perimeter of the first image includes at least a first reference point and a second reference point and correcting for perspective distortion alters the shape of the perimeter of the first image by moving the first reference point relative to the second reference point.

41. The article of claim 40 wherein the first and second reference points are vertices defined by the shape of the perimeter of the first image.

42. The article of claim 41 wherein the shape of the perimeter of the first image is rectangular and correcting for perspective distortion alters the shape of the perimeter of the first image into trapezoid.

43. The article of claim 23, wherein determining the focal length and rotation angles is further based on the shape of the perimeter of the first image.

44. The article of claim 23 wherein the perimeter of the first image has the same shape as the perimeter of the reference image.

* * * * *

UNITED STATES PATENT AND TRADEMARK OFFICE
CERTIFICATE OF CORRECTION

| | |
|---|---|
| PATENT NO. | : 7,006,707 B2 |
| APPLICATION NO. | : 09/848017 |
| DATED | : February 28, 2006 |
| INVENTOR(S) | : John W. Peterson |

It is certified that error appears in the above-identified patent and that said Letters Patent is hereby corrected as shown below:

Column 15, line 66, delete "firm" and replace with --form--;
Column 18, line 18, after "reference", delete the comma;
        line 48, delete "valves" and replace with --values--;
Column 20, line 15, after "into", insert --a--.

Signed and Sealed this

First Day of August, 2006

JON W. DUDAS
*Director of the United States Patent and Trademark Office*